US012658002B2

(12) United States Patent

Russ et al.

(10) Patent No.: US 12,658,002 B2

(45) Date of Patent: Jun. 16, 2026

(54) AI-BASED HOPPING REWARD PROGRAM

(71) Applicant: IGT, Las Vegas, NV (US)

(72) Inventors: Michael Russ, Graz (AT); Soheil Latifi, Moncton (CA)

(73) Assignee: IGT, Las Vegas, NV (US)

( * ) Notice: Subject to any disclaimer, the term of this patent is extended or adjusted under 35 U.S.C. 154(b) by 667 days.

(21) Appl. No.: 17/748,848

(22) Filed: May 19, 2022

(65) Prior Publication Data

US 2023/0377421 A1 Nov. 23, 2023

(51) Int. Cl.
*G07F 17/32* (2006.01)

(52) U.S. Cl.
CPC ...... *G07F 17/3267* (2013.01); *G07F 17/3239* (2013.01); *G07F 17/3272* (2013.01)

(58) Field of Classification Search
CPC ............ G07F 17/3267; G07F 17/3239; G07F 17/3272
See application file for complete search history.

(56) References Cited

U.S. PATENT DOCUMENTS

| | | | |
|---|---|---|---|
| 8,009,863 | B1 | 8/2011 | Sharma et al. |
| 8,117,061 | B2 | 2/2012 | May et al. |
| 8,147,334 | B2 | 4/2012 | Gatto et al. |
| 8,708,791 | B2 | 4/2014 | Nguyen et al. |
| 8,764,566 | B2 | 7/2014 | Miltenberger et al. |
| 8,864,586 | B2 | 10/2014 | Nguyen |
| 9,283,476 | B2 | 3/2016 | Mityagin et al. |
| 9,295,908 | B2 | 3/2016 | Froy et al. |
| 9,616,329 | B2 | 4/2017 | Szufnara et al. |
| 10,042,748 | B2 | 8/2018 | Gadher et al. |
| 10,553,072 | B2 | 2/2020 | Acres |
| 10,977,662 | B2 | 4/2021 | Shaw |
| 2004/0120581 | A1 | 6/2004 | Ozer et al. |
| 2006/0009278 | A1* | 1/2006 | Vancura .............. G07F 17/3244 463/25 |
| 2010/0124980 | A1 | 5/2010 | Acres |
| 2019/0188955 | A1* | 6/2019 | Miri .................... G07F 17/3255 |

(Continued)

OTHER PUBLICATIONS

"About Acres," Fantini's Gaming Show, 2021, 5 pages [retrieved online Sep. 13, 2022 from: web.archive.org/web/20210918201942/https://www.fantinisgamingshow.com/exhibitors/2434-acres-].

(Continued)

*Primary Examiner* — Kang Hu
(74) *Attorney, Agent, or Firm* — Sheridan Ross P.C.

(57) ABSTRACT

A gaming system, device, and method supportive of a self-evolving, AI-based player and other behaviors are provided. The gaming system, device, and method tracks in real time gameplay behavior of a set of players in different gameplay sessions to generate real time gameplay data; based on the real time gameplay data, modifies a player behavior model corresponding to each player in the set of players and a collective behavior model representing a collective behavior of the set of players, for each player in the set of players, determines, by a selected player behavior model, a predicted gameplay behavior in response to a reward offering, and compares a predicted gameplay behavior for each player to one or more player gameplay behavior eligibility thresholds and/or a predicted gameplay behavior of another player to select players eligible to receive the reward offering.

20 Claims, 8 Drawing Sheets

(56) References Cited

U.S. PATENT DOCUMENTS

| | | | | |
|---|---|---|---|---|
| 2021/0319656 | A1 | 10/2021 | Vasquez et al. | |
| 2022/0068085 | A1* | 3/2022 | Akers | A63F 1/14 |
| 2022/0083692 | A1 | 3/2022 | Maduranthakam Kidambi Sridhar et al. | |
| 2022/0083739 | A1 | 3/2022 | Magnusson et al. | |
| 2022/0083810 | A1 | 3/2022 | Khanna | |
| 2022/0083815 | A1 | 3/2022 | Khanna | |
| 2023/0051449 | A1* | 2/2023 | Froy | G07F 17/3237 |
| 2023/0169823 | A1* | 6/2023 | Froy | G06N 3/0464 463/43 |

OTHER PUBLICATIONS

"Acres Data," Acres Manufacturing Company, 2021, 3 pages [retrieved online from: web.archive.org/web/20211019112139/https://acresmanufacturing.com/data].

"Artificial intelligence," Wikipedia, last updated Mar. 16, 2022, 47 pages [retrieved online Mar. 20, 2022 from: en.wikipedia.org/w/index.php?title=Artificial_intelligence&oldid=1077383949].

"Fraud Detection in Online Sports," DataRobot, Inc., updated Nov. 30, 2021, 4 pages.

"Harmful gambling behavior prediction," DataRobot, Inc., updated Nov. 30, 2021, 4 pages.

"How big data is used by online gaming companies," Business Case Studies, Jun. 12, 2019, 5 pages [retrieved online Sep. 13, 2022 from: businesscasestudies.co.uk/how-big-data-is-used-by-online-gaming-companies].

"Introduction to Machine Learning using Python," GeeksforGeeks, last updated Nov. 1, 2019, 7 pages [retrieved online Sep. 13, 2022 from: web.archive.org/web/20211130110107/https://www.geeksforgeeks.org/introduction-machine-learning-using-python].

"OPTX Platform," optx.com, 2021, 9 pages [retrieved online Sep. 13, 2022 from: web.archive.org/web/20211019202331/https://optx.com/platform].

"Predict Player Lifetime Value in Gambling & Casinos," DataRobot, Inc., Updated Nov. 9, 2021, 4 pages [retrieved online Sep. 13, 2022 from: pathfinder.datarobot.com/use-case/predict-player-lifetime-value-in-gambling-casinos?tab=overview].

"Prevent Churn in Online Sports," DataRobot, Inc., last updated Dec. 1, 2021, 5 pages [retrieved online Sep. 13, 2022 from: pathfinder.datarobot.com/use-case/prevent-churn-online-sports?tab=overview].

"Unsupervised learning," Wikipedia, last updated Apr. 21, 2022, 5 pages [retrieved online May 2, 2022 from: en.wikipedia.org/w/index.php?title=Unsupervised_learning&oldid=1083933993].

What is pytorch and tensorflow, Google Search Results, retrieved May 2, 2022, 3 pages.

Bilbro "An Introduction to Machine Learning with Python," District Data Labs, Dec. 24, 2017, 20 pages [retrieved online May 2, 2022 from: https://medium.com/district-data-labs/an-introduction-to-machine-learning-with-python-92bcaf651ac4].

Brown "Machine learning, explained," MIT Sloan School of Management, Apr. 21, 2021, 12 pages [retrieved online Mar. 20, 2022 from: mitsloan.mit.edu/ideas-made-to-matter/machine-learning-explained].

Gruetze "Focus on Acres: Acres' Foundation aims to improve player experience, casino profit," CDC Gaming Reports, Sep. 14, 2021, 4 pages [retrieved online Sep. 13, 2022 from: www.cdcgamingreports.com/focus-on-acres-acres-foundation-aims-to-improve-player-experience-casino-profit].

Joby "Unsupervised Learning: How Machines Learn on Their Own," G2.com, Inc., Mar. 19, 2021, 8 pages [retrieved online May 3, 2022 from: learn.g2.com/unsupervised-learning#:~:text=Unsupervised%20learning%20lets%20machines%20learn,for%20achieving%20artificial%20general%20intelligence.].

Palma "Here's How Casinos Are Using AI," Adventures in Consumer Technology, May 23, 2021, 4 pages [retrieved online Apr. 28, 2022 from: medium.com/adventures-in-consumer-technology/heres-how-casinos-are-using-ai-465bc5c92ef2].

Wargo "Focus on Acres: The Foundation App Store provides a marketplace for casino operators," CDC Gaming Reports, Jan. 14, 2022, 3 pages [retrieved online Sep. 13, 2022 from: https://www.cdcgamingreports.com/focus-on-acres-the-foundation-app-store-provides-a-marketplace-for-casino-operators].

* cited by examiner

AI-BASED HOPPING REWARD PROGRAM

BACKGROUND

The present disclosure is generally directed toward gaming devices and systems and, more specifically, self-evolving, artificial intelligence (AI)-based player and reward models.

Casino models have employed AI to analyze casino floor performance, propose to operators where and how many EGMs to place in their venue, and provide other casino floor performance recommendations.

BRIEF SUMMARY

In certain aspects, the present disclosure relates to a gaming system, device, and method supportive of self-evolving, AI-based player and gaming system behaviors.

A system includes a communication interface; a processor coupled with the communication interface; and a computer-readable storage medium coupled with the processor. The computer readable storage medium storing data thereon that enables the processor to:

- track in real time gameplay behavior of a set of players in different gameplay sessions to generate real time gameplay data;
- based on the real time gameplay data, modifying, by a machine learning network, a player behavior model corresponding to each player in the set of players, the player behavior model corresponding to each player in the set of players being different from a player behavior model of another player in the set of players, and a collective behavior model representing a collective behavior of the set of players;
- for each player in the set of players, compare output from the player behavior model corresponding to each player in the set of players against output from the collective behavior model to select at least first and second players satisfying one or more player gameplay behavior thresholds; and
- provide, during at least first and second gameplay sessions of the at least first and second players, respectively, a reward indicator to a gaming device of each of the at least first and second players, the reward indicator corresponding to an opportunity to receive a reward in addition to a gameplay session outcome.

A method includes the steps of:

- tracking in real time gameplay behavior of a set of players in different gameplay sessions to generate real time gameplay data;
- based on the real time gameplay data, modifying a player behavior model corresponding to each player in the set of players, the player behavior model corresponding to each player in the set of players being different from a player behavior model corresponding to another player in the set of players, and a collective behavior model representing a collective behavior of the set of players;
- for each player in the set of players, determining, by a selected player behavior model, a predicted gameplay behavior of a corresponding player in response to a reward offering, the reward offering being independent of a final outcome of a current gameplay session associated with the corresponding player;
- comparing, for each player in the set of players, a predicted gameplay behavior to (a) one or more player gameplay behavior eligibility thresholds and/or (b) a predicted gameplay behavior of another player to select at least first and second players eligible to receive the reward offering; and
- providing, during at least first and second gameplay sessions of the at least first and second players, respectively, a reward indicator associated with the reward offering to a gaming device of each of the at least first and second players.

A system includes a communication interface, a processor coupled with the communication interface, and a computer-readable storage medium coupled with the processor. The computer-readable storage medium comprises processor-executable instructions that, when executed by the processor, cause the processor to:

- track in real time gameplay behavior of a set of players in different gameplay sessions to generate real time gameplay data;
- based on the real time gameplay data, modify a gameplay behavior model;
- determine, using the gameplay behavior model, a predicted behavior resulting from a reward program offering, the reward program offering being independent of a final outcome of a current gameplay session;
- compare the predicted behavior to a set of requirements to determine to offer the reward program offering to one or more players in the set of players;
- providing, during one or more gameplay sessions of the one or more players a reward indicator associated with the reward offering to a gaming device of each of the one or more players;
- determine, from a gameplay data, a set of results corresponding to the reward offering;
- comparing, by a machine learning network, the set of results against the predicted behavior; and
- updating the gameplay behavior model based on a difference between the set of results and the predicted behavior.

Additional features and advantages are described herein and will be apparent from the following Description and the figures.

DETAILED DESCRIPTION

Figure 1:
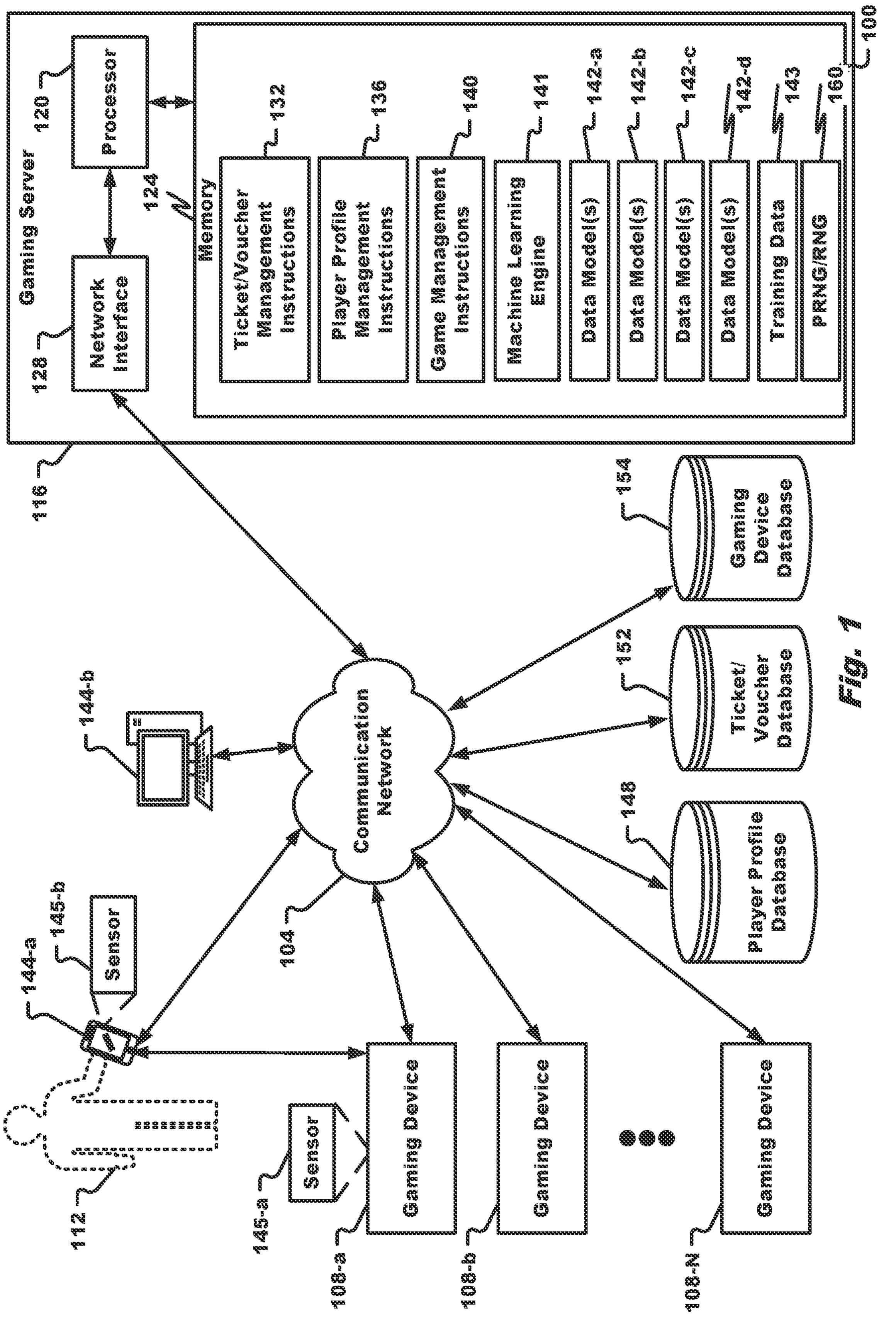
FIG. 1 is a block diagram of a gaming system in accordance with aspects of the present disclosure.

Aspects of the present disclosure will be described in connection with self-evolving, artificial intelligence (AI)-based models (also referred to as self-learning, AI-based models) in an environment such as, for example, a casino environment. While some examples in the present disclosure may reference the use of an Electronic Gaming Machine (EGM) as a gaming device via which players may participate in gaming activity, it should be appreciated that aspects of the present disclosure are not so limited. For example, any computing device, personal gaming device, or collection of computing devices may be used to facilitate invoking and implementation of self-evolving AI-based player behaviors.

As described below, aspects of the present disclosure may use one or more self-evolving, AI-based models to observe all players' gameplay behaviors in real-time (considering factors such as speed of play, cash in amount, cash out amount, play session length, additional in-session cash in amounts, wager behavior (e.g., change of wager behavior, average wager amount, Min/Max wager amount, wager to win correlation (changing after winning?), number of lines played, denomination selected, side bet features activated/deactivated, and playing double-up or similar features and other metrics of wager behavior).

, wagering speed, idle time, etc.) and compare—in real-time—each player's behavior with other players' behaviors and/or with a behavior of a representative player derived from real time and historical gameplay data of a group of players. Based on the comparative gameplay or playstyle behaviors of the various players and/or player status, players can become eligible to be part of a reward program that moves a reward indicator from gaming device to gaming device during gameplay (e.g., gaming) sessions until awarded to an eligible player. For example, an announcement of the reward offering, or reward indicator, can hop or move sequentially from EGM to EGM of each of the eligible players. The announcement of the reward offering can be in a visual or auditory form depending on the application. For example, the announcement can be an avatar displayed on each player's EGM that moves or hops from display to display and can be accompanied by lighting and sound effects.

The reward program is offered to cause players to behave in a desired manner (e.g., increased playing intensity to create enough revenue per time). The reward can take many forms and is generally awarded independently of the outcome of the gameplay session, though it may be dependent on gameplay session events, for the purpose of inducing players to change a gameplay behavior in a manner predicted by a data model. Stated differently, the reward is generally independent of the final outcome of the game, but the gaming session and what has happened so far in the gaming session have an effect on the reward system. Thus, a player may lose the game but still receive the reward. Additionally, game events can be a factor in determining whether someone is eligible or not for the reward offering, AI can make a real-time determination of which players are eligible to potentially gain the reward offering and why, based on comparison of player behavior model output based on each player's real-time gameplay data to player behavior output based on real-time gameplay data of other players and/or of collective behavior output based on real-time and historic gameplay data from multiple gameplay sessions of a group of other players (e.g., output of an "average casino model"). AI can observe and compare in real time all players' behaviors and the respective revenues realized by the players as a function of time—which cannot be done mentally.

The reward program can be fully executed by the AI system and require neither casino nor gaming staff to identify such players nor to hand deliver an incentive to an eligible player. The reward program can provide an extra amount of money or other incentives, that can award a "good revenue creating player" or a "very loyal player", directly from a gaming device, while they are playing a gameplay session, without having the reward program being part of the gameplay session.

The reward program offering can induce an illusion of competition among players. A key contributor to higher levels of satisfaction for players in games of chance, skill or combinations thereof is often an illusion of control and competition. During gameplay sessions, the reward program indicator, or avatar, moves or hops at substantially optimal and correct intervals accompanied by auditory (e.g., sounds) and visual effects (e.g., gaming device and other lighting) to appropriate gaming device displays. In response to the reward program indicator moving from gaming device to gaming device independently of the gameplay events occurring during the eligible players' gameplay sessions, players can be encouraged, by an illusion of competition and "hype", to have increased gameplay sessions at a gaming device (e.g., returning to a gaming device for subsequent gameplay sessions and playing gameplay sessions more intensely), increased playing speed or intensity (e.g. play faster and create more revenue), increased gameplay duration at a gaming device (e.g., spending a longer amount of time at a gaming device due to preference and/or user convenience regarding the model's support), positively associate the potential reward as a thrill-factor in the game or other gameplay session (e.g., the player will feel that he gets extra and better rewarded for playing the gaming device well), and enable gaming systems operators to have higher levels of floor (e.g., casino gaming device) utilization by selecting less occupied areas of the floor for the reward offering. Furthermore, the AI component can enable the gaming system to operate much faster and much more accurately compared to traditional loyalty incentives.

In some gaming environments (e.g., casino environments), an EGM may include a player behavior model (e.g., a gameplay assistant, a gameplay model, a player companion, etc.) which, when activated during a gameplay session at the EGM, may assist the player and/or server as a personalization enabler. However, in some other implementations of player behavior models, the player behaviors are hard-coded and created with either common player traits (e.g., generic behaviors, personalities, etc.) and/or are based upon a relatively limited number of parameters. A technical problem of such player behavior models is their inability to behave "intelligently" (e.g., in more complex gameplay situations) in supporting user-tailored experiences. For example, in some systems, such player behavior models are not fed with additional data (e.g., feedback, gameplay data, etc.) and are unable to evolve beyond a base model. In some cases, the player behavior models are incapable of drawing on self-learning implications.

A further technical problem of existing player behavior models is how to create, update, maintain and use output from numerous player-specific self-evolving AI-based behavior models to enhance performance of a gaming system. Data processing to maintain these models, in real-time across many players at one-second intervals, is computationally challenging and intensive. How to incorporate such models into existing gaming systems to enhance gaming system operation and player enjoyment without undue computational costs and processing latency creates yet another technical problem.

A technical solution provided by aspects of the present disclosure combines player-specific behavior models with representative player behavior, gaming system behavior, and reward program models in a casino environment (e.g., associated with EGMs) in which the models are capable of self-evolving (also referred to herein as self-learning) based on gameplay decisions, gameplay outcomes, and other player related parameters (e.g., behavioral shifts in gameplay decisions, biometric data, wager behavior, etc.). Player behavior can include, for example, gameplay patterns and/or gameplay style of a player. For example, a gameplay system may support initial training and creation of a baseline model, in which the baseline model is associated to a corresponding object (e.g., individual player, representative player, gaming system, or reward program). The system may continuously feed the model with real time player and gaming system data (e.g., gameplay decisions, behavioral shifts, button inputs, etc.) generated by the player or EGM or other gaming system component in association with a gameplay session. In some aspects, via AI mechanisms, the model may self-evolve to enhance itself on order to optimize the gaming experience for the player. In addition of the models to use real-time gameplay data to maintain/update/improve model capabilities, the models can provide output to the operator that can be used internally (for in-depth analysis purposes). Aspects of the present disclosure describe example techniques associated with generating such models, example methods of implementing the models in a gameplay environment (e.g., casino environment), examples of modifying the models, and example use-cases thereof.

For example, aspects of the present disclosure support the creation and application of "intelligent," self-learning models. In an example, the models described herein may support learning or evolving based on multiple different input sources (e.g., player data, player-related parameters (e.g., speed of play, cash in amount, cash out amount, play session length, additional in-session cash in amounts, wager behavior, wagering speed, and idle time), etc.) to increase the complexity and range of functionality of the models. Accordingly, for example, the gaming system and representative player behavior models provide predictive output to enable the reward program model to trigger and configure player reward programs and predictive output of the individual player behavior models to enable the reward program model to select a subset of current players whom are most likely to respond to the reward program in a manner satisfying the program's goals and objectives. Rewards are generally independent of a gameplay session outcome and can include mystery cash wins, mystery-triggered bonus games, other secondary bonus games, hopping bonus WILD symbols, a side jackpot independent from the game itself, meals/stays, or other loyalty rewards for the casino floor, tangible goods, etc.

Example aspects of the present disclosure may provide increased gaming experience for players (e.g., utilizing player-based models and the reward program model) by providing more variety and aiming for more player excitement. In some examples, incorporation of such player-based models and the reward program model may provide increased player engagement created via utilized player-based gaming, which may support higher revenue (e.g., at a casino venue).

According to example aspects of the present disclosure, a gaming server (and/or a gaming device) may track, in real time for multiple players, player gameplay behavior (e.g., gameplay decisions) in different gameplay sessions and all game situations (e.g., gameplay decisions with respect to decision events such as gameplay choices, slot pulls, bonus selections, etc.) to generate real time gameplay data (or gameplay data such as average speed of play, average cash in amount, average cash out amount, average play session length, average additional in-session cash in amounts, average wager behavior, average wagering speed, and average idle time for historical gameplay sessions).

For example, the gaming server may log the player decisions and provide (e.g., using a machine learning engine, also referred to herein as a machine learning network) real-time analysis with respect to the player decisions. In some aspects, using the machine learning engine, the gaming server may extract meaningful patterns from gameplay data and use the extracted meaningful patterns to make decisions and/or predictions that are based on a data that is relatively larger and higher in complexity compared to data analysis in some other systems. For example, aspects of the present disclosure support machine learning decisions and predictions that provide analysis beyond "simple" mathematical calculations implemented in some techniques which focus only on pure data analysis. The machine learning network can create a model with tunable parameters that can adjust themselves to available gameplay data followed by receiving new gameplay data and enabling the model to extrapolate. The model can thus balance between precisely capturing the behavior or known data while generalizing enough to predict the behavior of unknown data.

Based on the real time gameplay data, the machine learning network modifies a player behavior model corresponding to each of the players, the corresponding player behavior model of each player being different from one another, and a collective behavior model (e.g., the representative player behavior model and/or gaming system behavior model discussed below) representing a collective behavior of the set of players. For each of the players, the gaming server compares output from the corresponding player behavior model against output from the collective behavior model and/or against output from a player behavior model of one or more different players to select at least first and second players satisfying one or more player gameplay behavior thresholds (e.g., a predicted reaction of a selected player to being offered the reward (such as an increased speed of play, money wagered per time, and floor-average comparison) and a casino benefit realized from offering the reward to the selected player). The gaming server then offers a reward to each of the at least first and second players, the reward (e.g., mystery cash win, mystery triggered bonus game, bonus WILD symbol, side jackpot, and a loyalty reward) being independent of a final outcome of a current gameplay session associated with the at least first and second players. A reward indicator associated with the reward offering can be presented to the players in many different forms, such as an avatar. The reward indicator can move or hop at the same or different hopping intervals from a first gaming display rendering a first gameplay session, associated with the first player to a second gaming display rendering a second gameplay session associated the second player.

In some aspects, summarized gameplay data can be used to create, maintain, and update the self-evolving, AI-based representative player and gaming system models and granular gameplay data on a per-player basis can be used to create, maintain, and update the self-evolving, AI-based individual player behaviors. Using summarized and granular gameplay data in different models can provide substantial computational savings and increase computational efficiencies. This can enable the real time application of the reward program model as gameplay data is received, thereby limiting program latency due to data processing limitations.

Aspects of the present disclosure may provide explicit improvements through AI. For example, systems described herein may support more accurate recommendations (e.g., reward configuration parameter recommendations, etc.) and/or predictions of behaviors (e.g., predicted player behaviors) based on a huge number of historical player behavior data. In some aspects, multiple thousands (e.g., millions) of historical decisions may be incorporated into a model(s) described herein. Aspects of the present disclosure support modifying (e.g., changing, adjusting) the model(s) over time, based on single decisions made (e.g., per each instance of a gameplay decision such as granular gameplay data), groups of decisions made (e.g., per multiple instances of gameplay decisions such as summarized gameplay data). Example techniques described herein may provide reduced processing overhead (e.g., computing power, calculation time, etc.) compared to other techniques that analyze all single entries of historical data and compare the entries against new data, instead of using an AI model.

Aspects of the present disclosure may support output-learnings. For example, the gaming server (e.g., using a machine learning network and a model, etc.) may compare an action or event (e.g., a new gameplay decision by a player, a new gameplay entry, a new gameplay outcome, a new gameplay parameter, etc.) to previous actions and/or events (also referred to herein as historical actions and/or historical events) by a player. In an example, the gaming server may determine that there is a match between the action or event and a previous action or event. For example, the gaming server may determine that the action or event is the same as a previous action or event (or similar to the previous action or event with respect to a deviation threshold) under similar gameplay conditions. In some aspects, the gaming server may determine that there is a match between the action or event (e.g., gameplay decision, entry, outcome, or other gameplay parameter) and an action or event (e.g., a gameplay decision, entry, outcome, or other gameplay parameter) predicted by the gaming server. The gaming server may add the action or event to a history of previous gameplay actions or events (also referred to herein as historical recordings) so as to establish and/or verify accuracy of an applied model with respect to the action or event. The history may be implemented at a database, a memory, or the like.

Additionally, or alternatively, the gaming server may determine that there is not a match between the action or event and a previous action or event. For example, the gaming server may determine the action or event is different from a previous action or event under similar gameplay conditions, the action or event exceeds a similarity or deviation threshold with respect to the previous action or event, the action or event is different from and/or exceeds the similarity or deviation threshold with respect to an action or event predicted by the gaming server, etc. The gaming server (e.g., using a machine learning engine) may apply learning techniques associated with identifying the reason of the mismatch. For example, the gaming server may identify whether the mismatch is a result of a spontaneous or non-rational decision by the player, a general behavioral shift of the player, reward offering mechanism or configuration parameter change, change in player environment, an external factor (e.g., time of day, day of week, or holiday), etc.

In some aspects, the gaming server may identify behavioral changes (e.g., potential new behaviors, behavioral shifts, etc.) associated with the player, group of players, or gaming system, and the gaming server may modify tunable model parameters of the appropriate model based on the behavioral changes. That is, for example, the gaming server may modify the model to account for different behavioral changes when providing recommended actions or predicted behaviors.

In some aspects, the analysis by the gaming server (e.g., by the machine learning network, model, etc.) may be handled invisible to a player. A player may also be referred to herein as a customer. Aspects of the present disclosure support evolving a model based on new gameplay actions or events, and the gaming server may provide behavior predictions based on the evolution of the appropriate model.

In some aspects, the representative player behavior and gaming system model provide predicted behaviors of a representative player of a selected player group and selected part of the gaming system (e.g., projected speed of play, money wagered per time, floor-average comparison or heat map (e.g., an artificial map of the casino floor and the places and statuses of each of the gaming devices, in real-time, reflecting what is going on in the reward program), pulse-to-hit frequency, revenue or income, etc.) to the reward program model over a future time period. Based on the input and factors such as desired net wins for the gaming system, the reward program model can tentatively determine whether to trigger a reward program offering.

When the tentative determination is to trigger a reward program offering, the reward program model uses predicted individual player behaviors outputted by the player-specific models associated with a group of current players to select a subset of the players to whom the reward should be offered. The reward program model predicts the reaction of each of the players in the subset of current players to the reward offering and predicts how much revenue and positive outcomes will likely be gained through the reward offering. The reward program model can initiate the reward if deemed worthwhile (e.g., as defined by hyperparameters in the form of predetermined rules and settings of operators). When the reward is to be initiated, the reward program model determines the configuration of the reward program offering parameters (e.g., reward type and amount or payout, pulse-to-hit frequency, player eligibility criteria, and reward offering mechanism (e.g., avatar appearance movement path on each gaming device display, auditory and visual parameters, residence time on each gaming device before a next hop, and lighting effects).

The configuration of the reward program offering parameters can vary eligible player-by-eligible player. For example, a first gaming device of a first player can display a different avatar with a different path of movement and different lighting and sounds and for a different residence time than a second gaming device of a second player. The difference in parameters can be based on comparing predicted behaviors from each of the first and second player's behavior model so as to optimize a likelihood that a desired gameplay response from each of the first and second players to the reward offering will occur. Because all players have differing playstyles, emotional responses, and other gameplay behaviors, the reward program may be customized for each player based on output from the corresponding player's behavior model.

In some aspects, the player behavior models can detect different players and their particular playstyles, and based on similarity of bonus games, jackpots, secondary game bonus rounds, and other earned gameplay rewards (collectively "bonus behavior"), the reward program mechanism can lead to mapping or predicting a post bonus behavior to a post reward behavior. In other words, a player's increase of engagement after earning a bonus game, jackpot, secondary bonus game, or other earned gameplay reward can indicate that he will do the same when facing a reward program offering. As noted, the difference between the post bonus behavior and the post reward behavior is that the reward is not a part of the game and will not typically change the volatility of the game.

With reference initially to FIG. 1, details of an illustrative gaming system 100 will be described in accordance with at least some embodiments of the present disclosure. The components of the gaming system 100, while depicted as having particular instruction sets and devices, are not necessarily limited to the examples depicted herein. Rather, a system according to embodiments of the present disclosure may include one, some, or all of the components depicted in the gaming system 100 and does not necessarily have to include all of the components in a single device. For example, the components of a server may be distributed amongst a plurality of servers and/or other devices (e.g., a gaming device, a portable user device, etc.) in the gaming system 100 without departing from the scope of the present disclosure.

The gaming system 100 may include a communication network 104 that interconnects and facilitates machine-to-machine communications between one or multiple gaming devices 108 (e.g., any of gaming device 108-*a* through 108-N) and a gaming server 116. It should be appreciated that the communication network 104 may correspond to one or many communication networks without departing from the scope of the present disclosure. In some embodiments, gaming device 108-*a* through gaming device 108-N and gaming server(s) 116 may be configured to communicate using various nodes or components of the communication network 104. The communication network 104 may include any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may include a number of different communication media such as coaxial cable, copper cable/wire, fiber-optic cable, antennas for transmitting/receiving wireless messages, and combinations thereof.

In some embodiments, the gaming devices 108 (e.g., gaming device 108-*a* through gaming device 108-N) may be distributed throughout a single property or premises (e.g., a single casino floor), or the gaming devices 108 (e.g., gaming device 108-*a* through gaming device 108-N) may be distributed among a plurality of different properties. In a situation where the gaming devices 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 (e.g., gaming device 108-*a* through gaming device 108-N) may utilize the same or different types of communication protocols to connect with the communication network 104. It should also be appreciated that the gaming devices 108 (e.g., gaming device 108-*a* through gaming device 108-N) may present the same type of game or different types of games to a player 112. For example, the gaming device 108-*a* may correspond to a gaming machine that presents a slot game to the player 112, the gaming device 108-*b* may correspond to a video poker machine, and other gaming devices 108 may present other types of games (e.g., keno, sports wagering, etc.) or a plurality of different games for selection and eventual play by the player 112.

In some aspects, some of the gaming devices 108 (e.g., gaming device 108-*a* through gaming device 108-N) may communicate or exchange data with one another via the communication network 104. In some embodiments, one or more of the gaming devices 108 may be configured to communicate directly with a centralized management server and/or the gaming server 116. Although not depicted, the gaming system 100 may include a separate server or collection of servers that are responsible for managing the operation of the various gaming devices 108 in the gaming system 100.

It should also be appreciated that the gaming server 116 may or may not be co-located with one or more gaming devices in the same property or premises. Thus, one or more gaming devices may communicate with the gaming server 116 over a WAN, such as the Internet. In such an event, a tunneling protocol or Virtual Private Network (VPN) may be established over a portion of the communication network 104 to ensure that communications between an EGM and the server 116 (e.g., a remotely-located server) are secured.

The gaming devices 108 (e.g., gaming device 108-*a* through gaming device 108-N) may correspond to a type of device that supports interaction by a player 112 in connection with playing games of chance. Examples of a gaming device 108 may include any type of known gaming device such as an EGM, a slot machine, a table game, an electronic table game (e.g., video poker), a skill-based game, etc. In addition to playing games on a gaming device 108, the player 112 may also be allowed to interact with and play games of chance on a communication device 144.

The gaming system 100 may support interaction with one or more communication devices 144. A communication device 144 (e.g., communication device 144-*a*) may be a mobile device of a player 112 (e.g., a personal communication device such as a smart phone, a tablet, a smart watch, etc.) or to a device issued by a casino to the player 112. It should be appreciated that the player 112 may play games directly on the communication device 144. Alternatively, or additionally, the communication device 144 may establish a communications (e.g., over a wireless or wired connection) with a gaming device 108 such that the communication device 144 provides an interface for the player 112 to interact with the gaming device 108. As shown in FIG. 1, the communication device 144 may be in communication with the communication network 104 or in direct communication (e.g., via Bluetooth, WiFi, etc.) with a gaming device 108. Non-limiting examples of a communication device 144 include a cellular phone, a smart phone, a tablet, a wearable device, an augmented reality headset, a virtual reality headset, a laptop, a Personal Computer (PC), or the like. In some cases, another communication device 144 (e.g., communication device 144-*b*) may be a mobile device, a PC, or the like of a casino operator (e.g., a floor attendant, a casino manager, etc.).

In some cases, the gaming system 100 may support "carding in" of a player at a gaming device 108 with a physical card (e.g., a player club card). In other cases, the gaming system 100 may support "carding in" of a player at a gaming device 108 via a mobile application on a communication device 144. In some aspects, the mobile application may support fund transfers between a player account and the gaming device 108 (e.g., a server, the casino). For example, using the mobile application, the player may transfer funds to a gameplay session.

In an example of "carding in," the communication device 144 may exchange information with the gaming device 108 over a wireless connection (e.g., near field communication (NFC), Bluetooth, etc.) when the communication device 144 is within a threshold distance of the gaming device 108. In another aspect, the communication device 144 may "card in" and exchange information with the gaming device 108 when the communication device 144 is connected to the gaming device 108 using a physical communications link (e.g., a communications cable). In an example, when "carding in," the communication device 144 may provide player identification information (e.g., player identity, player club status, player preference information, etc.) to the gaming device, the server, and/or the gaming system. The gaming server 116 (or the gaming device 108) may establish a gameplay session at the gaming device 108 for the player based on the information provided during the "card in."

The gaming server 116 is further shown to include a processor 120, a memory 124, and a network interface 128. These resources may enable functionality of the gaming server 116 as will be described herein. For example, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For example, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various authentication functions of the gaming server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data to and retrieve data from a player profile database 148, a ticket/voucher database 152, and/or a gaming device database 154.

Alternatively or additionally, the player profile database 148 or data stored thereon may be stored internal to the any of the communication device 144, a gaming device 108, and/or the server 116 (e.g., within the memory 124 of the server 116 rather than in a separate database). Alternatively or additionally, the ticket/voucher database 152 or data stored therein may be stored internal to the server 116. Alternatively or additionally, the gaming device database 154 or data stored thereon may be stored internal to the server 116.

The databases described herein (e.g., player profile database 148, ticket/voucher database 152, gaming device database 154) may include a relational database, a centralized database, a distributed database, an operational database, a hierarchical database, a network database, an object-oriented database, a graph database, a NoSQL (non-relational) database, etc. In some aspects, the databases may store and provide access to, for example, any of the stored data described herein.

In some aspects, the gaming system 100 may be implemented using a fully software-based solution. In some other aspects, the gaming system 100 may be implemented using a combination of software and hardware accelerators for offloading AI processing tasks and/or AI data handled at the gaming system 100. Aspects of the present disclosure and solutions thereof may be used locally at an EGM (e.g., a gaming device 108), a local server (e.g., gaming server 116 or a different server), and/or on a cloud server (e.g., gaming server 116 or a different server). Example processors (also referred to herein as co-processors) usable for offloading the AI processing tasks and/or AI data may include any combination of GPUs, ASICs, FPGAs, or the like. In some aspects, the processors (e.g., co-processors) may be located at a gaming device 108 and/or the gaming server 116. In some other aspects, processors (e.g., co-processors) located at a communication device 144 (e.g., a cellular phone, a smart phone, a tablet, a wearable device, an augmented reality headset, a virtual reality headset, etc.) may be used for offloading the AI processing tasks and/or AI data.

The gaming server 116 may support example aspects described herein of acquiring sensor data associated with a gameplay session using any combination of sensors 145

(e.g., sensor 145-*a*, sensor 145-*b*, etc.) (also referred to herein as sensor devices). The sensors 145 may be implemented at (e.g., integrated in) any combination of gaming devices 108 and/or communication devices 144. In some aspects, the sensors 145 may be standalone devices capable of communicating with any component (e.g., a gaming device 108, a gaming system 100, a database, etc.) of the gaming system 100, for example, via the communication network 104. In some aspects, the sensors 145 may provide the sensor data to a machine learning engine 141, aspects of which are described later herein.

In some aspects, the sensors 145 may include any combination of: an image sensor, an eye tracking sensor, a heart rate sensor, an infrared sensor, an audio sensor (e.g., a microphone), a pulse sensor, an oxygen sensor, a temperature sensor, a pressure sensor (e.g., integrated within a button, a keypad, etc.), a touch screen sensor, a vibration sensor, a motion sensor, an accelerometer, or the like. In some cases, the sensors 145 may be integrated within a physical interface of a gaming device 108 or a communication device 144. In some cases, the sensors 145 may be integrated at or within a threshold distance of a gaming device 108. For example, the sensors 145 may be integrated with a seat cushion, an arm rest, a seat back, a pull handle, a "spin" button, etc.

In some examples, the sensors 145 may capture or measure biometric data (e.g., facial features, facial response, eye movement, pupil dilation, heart rate, temperature, pulse, speech or speech patterns, breathing pattern, etc.) of a player with respect to a decision event, a gameplay decision, and/or a gameplay result in association with a gameplay session. The sensors 145 may detect changes and/or patterns in biometric data in association with a decision event, a gameplay decision, and/or a gameplay result in association with a gameplay session. In some aspects, the sensors 145 may include smart sensors capable of scanning and/or measuring a player's biometric parameters such as pulse, breathing rate, heart rate, eye focus, body movement, attention, electroencephalogram (EEG) parameters (e.g., electrical activity of the brain), electrocardiogram (ECG or EKG) parameters (e.g., heard rhythm and electrical activity), voice, speech pattern, etc.

In some other examples, the sensors 145 may capture or measure a value (e.g., force, velocity, etc.) corresponding to physical inputs (e.g., button presses, etc.) by the player at a gaming device 108 in association with a decision event, a gameplay decision, and/or a gameplay result in association with a gameplay session. For example, a sensor 145 (e.g., sensor 145-*a*) at a gaming device 108 (e.g., gaming device 108-*a*) may be a pressure sensor integrated within a button (e.g., a "spin" button, a "bet" button, etc.) at the gaming device 108, and the sensor 145 may capture or measure a value indicating a force at which the player presses the button.

Aspects of the present disclosure support providing the sensor data (e.g., biometric data, value corresponding to a physical input, etc.) to the machine learning engine 141. The machine learning engine 141 may use the sensor data to predict emotional states in connection with a bonus game, jackpot, secondary bonus game, and other earned gameplay reward or a reward program offering. Using the sensor data, for example, the machine learning engine 141 may determine emotional thresholds (e.g., level of satisfaction, excitement, happiness, etc.) associated with the player and/or predict emotional states associated with the player.

The illustrative instruction sets that may be stored in memory 124 include, without limitation, a ticket/voucher management instruction set 132, a player profile management instruction set 136, and a game management instruction set 140. Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Said another way, the particular instruction sets depicted in FIG. 1 should not be construed as limiting embodiments described herein.

In some embodiments, the ticket/voucher management instruction set 132, when executed by the processor 120, may enable the gaming server 116 to manage various tickets/vouchers issued by gaming devices 108 (e.g., gaming device 108-*a* through gaming device 108-N), manage ticket/voucher values, determine ticket/voucher states, update the ticket/voucher database 152, obtain information from the ticket/voucher database 152, determine that a ticket/voucher has been redeemed and notify the player profile management instruction set 136, etc. In embodiments where the ticket/voucher instruction set 132 is implemented in one system (e.g., a ticketing/voucher system) and the player profile management instruction set 136 is implemented in a separate system (e.g., a player tracking system), a communication link may or may not be implemented between the two systems. In such a situation, the tickets/vouchers issued by the ticketing/voucher system may be anonymous and not necessarily associated with any particular player or player profile.

In some embodiments, the ticket/voucher management instruction set 132 may be configured to perform any action consistent with the issuance of tickets/vouchers, tracking of ticket/voucher states, and determining whether/when/where a ticket/voucher has been redeemed. In some embodiments, the ticket/voucher management instruction set 132 may be configured to generate, or cause the game management instruction set 140 to generate, a synthesized credit meter for the first gaming device. For example, as gaming devices 108 (e.g., gaming device 108-*a* through gaming device 108-N) or a communication device 144 have their credit meters updated, the gaming server 116 may update a corresponding synthesized credit meter to reflect updates at the credit meters. In some embodiments, values of credit or other events stored in credit meters of gaming device 108 and/or a communication device 144 may be mirrored in a synthesized credit meter maintained by the gaming server 116.

The player profile management instruction set 136, when executed by the processor 120, may enable the gaming server 116 to manage one or more player profiles within the player profile database 148. In some embodiments, the player profile management instruction set 136 may be configured to manage a player loyalty profile including settings for such player profiles, available wager credits for such profiles, determine player wager history, loyalty reward account balance, loyalty reward eligibility, and/or determine which, if any, tickets/vouchers are associated with a particular player. It should also be appreciated that the player profile management instruction set 136 may be configured to manage player profiles of players that do not have loyalty accounts or any other predetermined player account.

In some aspects, the player profile management instruction set 136 may be configured to manage a player history associated with gameplay sessions. In an example, the player history may include user behavior (e.g., gameplay decisions) associated with previous and/or current gameplay sessions.

For example, the player history may include instances of bonus games, jackpots, secondary bonus games, or other gameplay rewards previously earned by the player and associated gameplay behavior (e.g., gameplay parameters indicating a player's increase of engagement resulting from receiving the bonus game, jackpot, secondary bonus game, or other gameplay reward). As will be appreciated, the instances can be vector representations (e.g., attributes or features) of monitored or tracked player behavior. The player history may include gameplay decisions (e.g., predicted gameplay decisions based on a player behavior, actual user decisions corresponding to predicted gameplay decisions, etc.) associated with a reward program offering.

Figure 4:
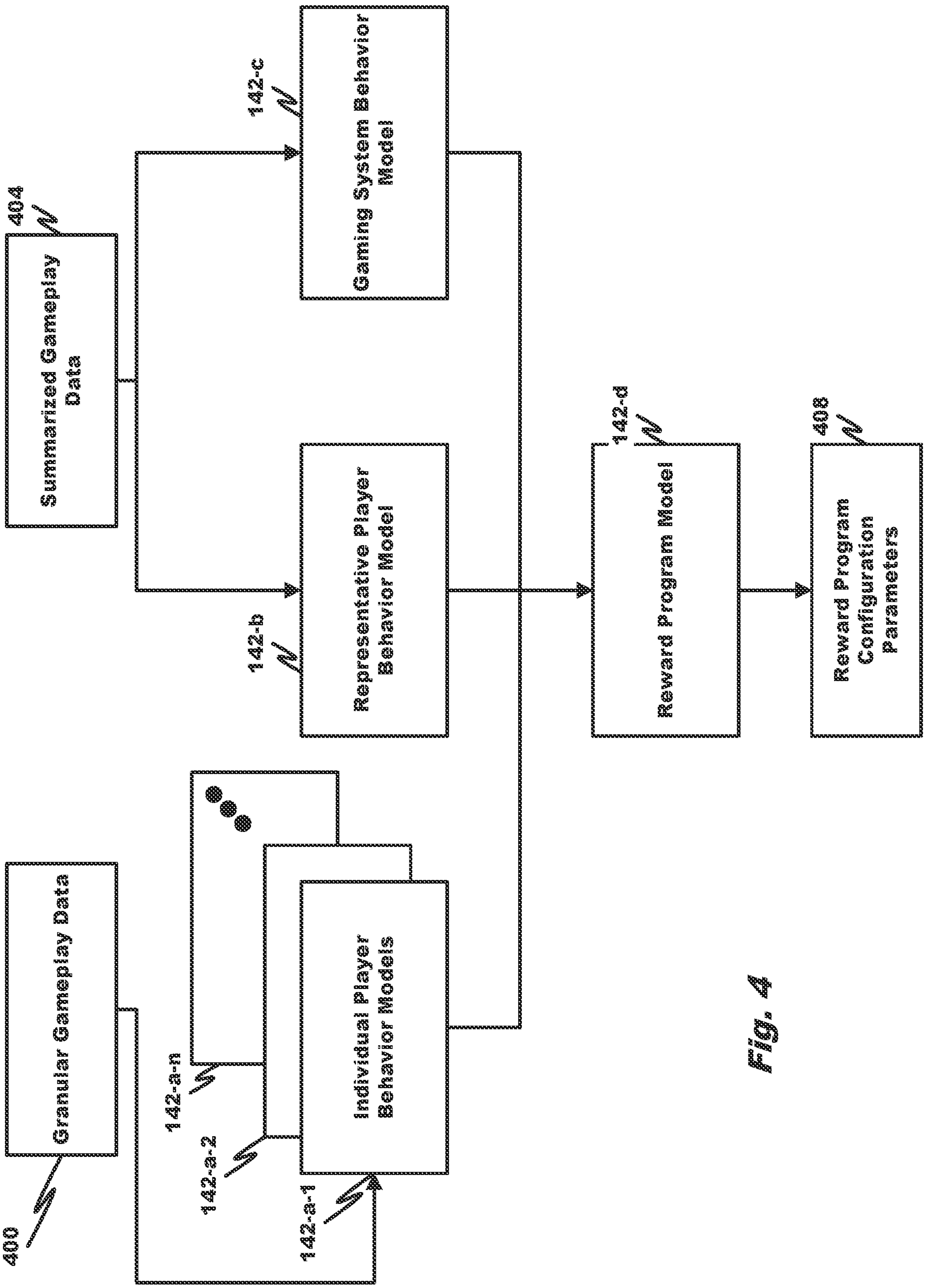
FIG. 4 is a block diagram illustrating self-evolving AI-based models in accordance with aspects of the present disclosure.

With reference to FIGS. 1 and 4 in some examples, the player history may include granular data 400 based on each gameplay action tracked by a gaming device (e.g., spin level) during a gameplay session. The granular data, or attributes or instances or feature vectors, can be extracted from EGM/VLT logs and data and, for each gameplay session, include, for example: total cash in amount (the total amount of money inserted by the player in the machine during a play session), average primary wager, standard deviation of primary wager, number of distinct primary wagers, number of primary wagers, total (sum of) primary wagers, session length (elapsed time is the amount of time that passes from the start of a session to the end of the session), number of games played (number of different primary themes played in a session), number of times the bonus was experienced (number of secondary games played in a session), possibility of cashing out after hitting a bonus in the game (this value states whether a player cashes out after winning a bonus or not), possibility of changing the game after hitting a bonus in the game (this value states whether a player changes a game after winning a bonus or not), available cash (bank) wager correlation (correlation between wager amount and available cash; available cash is the current credit amount available to the player on an EGM (i.e., amount to be paid if the player decided to cash out)), average time between spins (average of the time difference between consecutive spins), standard deviation of time between spins (standard deviation of the time difference between consecutive spins), total cash out, total primary win (sum of all wins resulting from primary spin), average primary win (average win per spin), average secondary wager (average wagers for secondary games in a session), average secondary win (average wins for secondary games in a session), sum of secondary win (total of wins in secondary games in a session), starting cash in (total amount of cash in at the start of the session before he starts playing), additional cash in (total amount of additional cash in after a player starts playing), coin-in to coin-out ratio (coin-in is the total wagers made in a session. coin-out is the total of how much a player has been paid back on those wagers (total winnings)), net loss (the difference between total wagers and total winnings (coin-in-coin-out) in a session), % Loss (the net loss divided by the total wagers), intensity (e.g., wagers per minute in a gameplay session), time of the day segment day/evening (a flag 1 or 0 to specify whether a session was during lunch time or not), cash out occurrence flag (flag to specify whether a player cashed out or ran out of money), cash out to cash in ratio (ratio of cash out to cash in), post loss (ratio of primary wager after a loss to the primary wager before), post win (ratio of the primary wager after a win to the primary wager before), primary wager changes (number of times a player changes primary wager), number of cash ins (number of times a player inserted money in a machine), average cash in, wager to cash in (ratio of the average primary wager to average cash), tradeoff (ratio of average win in primary over average primary wager), secondary to primary (ratio of secondary wager to primary wager), wager to bank ratio (average of the ratio of wager to available cash), primary wager changes/no games, maximum cash in, cash in separated by ticket, note and coin, number of cash outs, max cash out, number of primary wins, list of played games including number of plays, and list of played denominations including number of plays.

In some aspects, the machine learning engine 141 may use a data model 142-*a* (e.g., data model 142-*a*, also referred to herein as a player behavior model) configured to calculate or predict a gameplay behavior of a selected player with respect to different gameplay events, gameplay decisions, gameplay results, gameplay durations, etc. Each player 112-*a*-1, . . . n has a corresponding individual player behavior model 142-*a*-1, 142-*a*-2, . . . 142-*a*-*n*. For example, the machine learning engine 141 may use the data model 142-*a* to calculate or predict the response (e.g., post bonus behavior) of the corresponding player to earning a bonus game, jackpot, secondary bonus game, or other gameplay reward and/or reward program offering, using gameplay data (e.g., decision events, gameplay decisions, gameplay results, etc.) such as the attributes set forth above and sensor data (e.g., biometric data, pressure sensor data, etc.). The response relates typically to a level of intensity or increased play engagement by the respective player in response to earning a bonus game, jackpot, secondary bonus game, or other gameplay reward and/or reward program offering. The player behavior model can be for a type of gaming device (e.g., EGM or EGT) and/or type of game (e.g., slots, roulette, blackjack, poker, keno, etc.).

The gameplay data may include data received not only from a gaming device 108 but also from each player's communication device 144. This is particularly useful in gaming systems enabling gaming sessions to be played not only on gaming devices but also on communication devices.

In some aspects, the machine learning engine 141 may use a data model 142-*b* (e.g., data model 142-*b*, also referred to herein as a representative player behavior model) configured to calculate or predict a representative gameplay behavior of a group of players with respect to different gameplay events, gameplay decisions, gameplay results, gameplay durations, etc. For example, the machine learning engine 141 may use the data model 142-*b* to calculate or predict the representative response (e.g., representative post bonus behavior) of the group of players to earning a bonus game, jackpot, secondary bonus game, or other gameplay reward and/or reward program offering, using aggregated gameplay data (e.g., decision events, gameplay decisions, gameplay results, etc.) such as the attributes set forth above. The representative player behavior can be based on summarized gameplay data 404 over a selected time period derived from mathematically combining (e.g., averaging) multiple values of a selected attribute for different players in the group (over multiple gameplay sessions) to provide a representative value for the group of players as a whole. The representative response relates typically to a level of intensity or increased play engagement by a representative player in a group of players in response to earning a bonus game, jackpot, secondary bonus game, or other gameplay reward and/or reward program offering.

The representative player behavior can be based on the gameplay data from currently active players and/or model parameters and/or model output associated with the selected players currently playing at the gaming devices in the gaming system. A baseline representative player behavior model can be modified using the gameplay data from selected currently active players. The model parameters, for example, from the individual player behavior models of the selected currently active players could be mathematically combined (e.g., averaged) for the representative player representing the selected currently active players. The representative player behavior model can be for a type of gaming device (e.g., EGM or EGT) and/or type of game (e.g., slots, roulette, blackjack, poker, keno, etc.). While the representative player behavior model could be replaced with multiple outputs from the player behavior models of a selected group of active players, the processing resources required for such real time processing and comparisons can be prohibitive.

In some aspects, the machine learning engine 141 may use a data model 142-*c* (e.g., data model 142-*c*, also referred to herein as a gaming system behavior model) configured to calculate or predict a representative gaming system behavior of a group of gaming devices with respect to different gameplay events, gameplay decisions, gameplay results, gameplay durations, etc. For example, the machine learning engine 141 may use the data model 142-*c* to calculate or predict the representative response of the group of gaming devices to interactions with current players (e.g., which gaming devices and games are likely to be used over a future time interval, floor occupancy levels, and what revenue will be generated over the future time interval), using aggregated gameplay data such as the attributes set forth above. The gaming system behavior can be based on summarized gameplay data 404 over a selected time period mathematically combining (e.g., averaging or summing) multiple values of a selected attribute for a set of different gaming machines (over multiple players and multiple gameplay sessions) in the gaming system to provide a representative value for the gaming machines in the set. The gaming system behavior model can be for a type of gaming device (e.g., EGM or EGT) and/or type of game (e.g., slots, roulette, blackjack, poker, keno, etc.).

In some aspects, the summarized gameplay data 404 comprises attributes more generalized than those set forth above. In some embodiments, the summarized gameplay data 404 is mathematically derived (e.g., by averaging or otherwise aggregating) over a selected time interval from the values of each of the data fields for all gameplay sessions of a group of gaming devices. In other embodiments, fewer or consolidated fields are used. Exemplary attributes for summarized performance data for each gaming device over a selected time period include record identifier (Recordid), upload time stamp (UploadTimestamp), gaming device identifier (e.g., MachineSerialNumber), pull local timestamp (PullLocalTimestamp), vendor (e.g., casino) name (VendorName), (casino) currency code (CurrencyCode), game identifier (GameId), game name (GameName), denomination (Denomination), return to player (Rtp) base percentage RtpBasePercentage), total coin in credits (TotalCoinInCredits), total jackpot credits (TotalJackpotCredits), pull date (PullDate), time since previous pull (TimeSincePreviousPull), total coin in currency (TotalCoinInCurrency), total coin out currency (TotalCoinOutCurrency), total jackpot currency (TotalJackpotCurrency), total net win currency (TotalNetWinCurrency), total theoretical win currency (TotalTheoreticalWinCurrency), total games played (TotalGamesPlayed), total players played (TotalPlayersPlayed), and the like.

In some aspects, the machine learning engine 141 may feed the predicted behaviors over a future time interval from the individual player behavior models 142-*a*-1 . . . *n*, representative player behavior model 142-*b*, and gaming system behavior model 142-*c* to another data model 142-*d* (e.g., reward program data model 142-*d*). The reward program data model 142-*d* compares the predicted player behavior for each player in the set of players against one or both of the predicted behaviors of the representative player behavior model 142-*b* and gaming system behavior model 142-*c* to determine eligibility gameplay behavior thresholds for players and the subset of players satisfying the eligibility thresholds. In one embodiment, the gaming system behavior model prediction is used to trigger the reward program offering and the representative player behavior model prediction is used to provide eligibility gameplay behavior thresholds for the group of players represented by the representative player behavior model. Eligibility is determined by comparing a predicted response for each player in the group against the behavior thresholds provided by the representative player behavior model such that players having responses that provide higher levels of player engagement are deemed eligible while players having responses that provide lower levels of player engagement are deemed ineligible. In other embodiments, player eligibility is determined by comparing responses of each player behavior against the responses of the representative player behavior and gaming system behavior model to determine and apply eligibility thresholds.

In other embodiments, player eligibility is determined by comparing the predicted player behavior for each player in the set of players against the predicted behaviors of other players in the set of players to determine eligibility gameplay behavior thresholds for players and the subset of players satisfying the eligibility thresholds. For example, a selected number N of the players that are most likely to satisfactorily respond to the program reward offering are selected (e.g., the N players that are most likely to have a post bonus behavior satisfying desired goals and objectives (e.g., player eligibility thresholds) are deemed to be eligible. In this embodiment, a representative player behavior model may be unnecessary.

Based on the various behavior predictions, the reward program model 142-*d*, using hyperparameters such as the desired net wins for the casino, outputs reward program configuration parameters 408. The program configuration parameters 408 comprise reward program triggers, reward program payout, reward program indicators to be provided to the eligible players (e.g., lighting and sound effects, type and appearance of avatar, residence time and path of movement of the avatar on the display(s) of the gaming devices of the eligible players, and the like) and reward program pulse-to-hit frequency. These configuration parameters can be the same for all eligible players or differ from player to player.

The reward program model can be fully automatedly capable of executing the AI-based reward program. For example, based on all players' play behavior the reward program model determines which players are eligible to participate in the reward offering, based on which criteria, and for how long. Based on calculations of how much money was earned by the program so far, an eligibility dependent random or pseudorandom number generator (collectively referred to as PRNG/RNG 160) can determine/update the "pulse to hit" probability. The AI-based reward program model can then decide where the reward is hopping to).

In an example of reward indicator presentation, the reward indicator employs a radiant lighting system in gaming devices. Any of the AI-based models can detect when the behavior and engagement of one or more players becomes lethargic and react to this event by rewarding the most optimal player accompanied by abrupt music and lightings effects, thereby encouraging players for loyal and appreciative behavior and hyping up the atmosphere of the casino.

In another example, the gaming system activates gaming device frame lighting in a prominent coloring when the corresponding player is eligible (based on the player's real-time play behavior) to have the reward indicator potentially hopping onto the gaming device. The gaming system can activate the gaming device frame lighting in an extraordinary coloring and blinking, once the hopping reward indicator has hopped onto the player's gaming device and is "ready to be won".

In another example, the reward indicator is rendered as one or multiple "bunnies" that hop from a first eligible player's gaming device onto a second eligible player's gaming device, jumping on each gaming device display a few times from one symbol to another, and after some time jumps to a third eligible player's gaming device. If, however, the symbol position where the bunny is at is part of a win, the player can win a hopping reward. Based on the player's previous game play behavior and/or his eligibility status, the AI-based reward program model 142-*d* determines how long the bunny is on each player's machine and onto which symbols it jumps.

In another example, the model output is provided to the operator and allows the operator to identify not only loyal and competitive customers but also the hype and engagement level of the players. The reward program offering mechanism can also be given to the operator, for example if there is going to be a special event at a dedicated location of a casino or other gaming establishment, each reward indicator hopping interval can bring the focus closer and closer to that location. Also, if the operator's discretion, the reward indicator can hop on the gaming devices rarely visited. Although the overall aim and location is decided by the operator, it is the AI-based model in charge of the transition process.

In some aspects, player eligibility can be determined by additional factors to the player eligibility recommendations of the reward program model 142-*d*. For instance, the recommendations could be further filtered such that only "premium players" are deemed eligible to the reward program. Any number of criteria can determine how/when/why a player is graded a premium player. A premium player could be determined by a tournament-like scenario where players need to sign up for participating in the program. A premium player could be a based on participation in an exclusively "paid" participation in the reward program. Player eligibility could be a mix of players recommended by the reward program model and players, though not recommended by the model, are premium players.

In some aspects, the reward program are extended to a mobile application of the communication device 144 (e.g., installed in a player's phone). This can be useful when the player is not present when the hopping reward program is going on in the casino, such as when the player is within the top 10 players to participate in the reward program. The reward program could be selected enabled on the communication device only when the device is in certain spatial locations (such as within a specified area of a casino). In another example, a player, during a casino visit, plays in the casino and becomes eligible to participate in the hopping reward program. Once eligible, the reward program (e.g., reward indicator) would be implemented entirely on all eligible players' mobile devices, so that the players can participate in the reward program from a location outside the casino. In another example, upon reaching the eligibility status, the player would automatically be invited by his communication device to a meal or event in the venue. Implementation of the reward program would be suspended until the player returns to the venue and/or satisfies certain prerequisites (e.g., during the meal when all players sit at the same table (the reward would be consumed passively in that scenario, not requiring the players to do anything; or only very few actions, so they can enjoy the time with the others).

In some aspects, the gaming operator can set values for one or more hyperparameters for one or more of the models 142-*a*, 142-*b*, 142-*c* and 142-*d*. By way of illustration, the operator can set parameters in the reward program model 142-*d* for revenue triggers for instantiation of a reward program offering (e.g., how much money must be earned until the reward can be paid out earliest), jackpot numbers to be offered as rewards as a function of time (e.g., more minor jackpots instead of fewer bigger jackpots), and/or a reward program offering trigger percentage, and the like. Other parameters could be tunable by the machine learning network.

In some aspects, the individual player, representative player and/or gaming system behavior models and reward program model can be indexed or metadata tagged by seasons and/or specific events as different seasons or events can be associated with significantly different floor occupancy rate and/or players and play behaviors. Those seasonal or event-specific models could be executed whenever wanted, instead of the most recent play behavior. Other tags may be employed, such as associated with determined countries or regions.

The machine learning engine 141 may generate, train, retrain, and/or modify the various data models 142-*a*, 142-*b*, 142-*c*, and 142-*d* using subsequent gameplay and sensor data described herein and, in the case of the reward program model 142-*d*, outputs from the data models 142-*a*, 142-*b*, and 142-*c*.

The game management instruction set 140, when executed by the processor 120, may enable the gaming server 116 to manage the various games played by a player 112 at the gaming devices 108 (e.g., gaming device 108-*a* through gaming device 108-N) and/or a communication device 144 carried by the player 112. For example, any game played by the player 112 at any of the gaming devices 108 and/or communication device 144 may be managed, partially or entirely, by execution of the game management instruction set 140. The game management instruction set 140 may also be configured to track a status of wager events (e.g., non-EGM wager games, sporting events, bingo, keno, lottery, etc.) and whether a player 112 has placed a wager on such events. In some embodiments, when a wager event has come to completion such that wagers made on the event become payable (e.g., at the end of a gameplay decision at a gaming device 108 and/or communication device 144, at the end of a sporting event when the final score of the event is determined), the game management instruction set 140 may notify the ticket/voucher management instruction set 132, thereby enabling the ticket/voucher management instruction set 132 to update states and/or values of tickets/vouchers issued for the event appropriately.

In some aspects, the game management instruction set 140, when executed by the processor 120, may enable the gaming server 116 to manage and/or monitor data associated with a gameplay session at a gaming device 108. For example, the gaming server 116 may support example aspects described herein of monitoring user information (e.g., member identification information, player club status, etc.), gameplay data (e.g., quantity of plays, quantity of spins, duration of gameplay, credits spent, credits earned, etc.), and other gameplay data described above. The gaming server 116 may update the gaming device database 154, obtain information from the gaming device database 154, and notify the game management instruction set 140, etc.

In an example, the gaming server 116 may support example aspects described herein of identifying historical data (e.g., previous gameplay decisions) associated with previous gameplay sessions at gaming devices 108. In another example, the gaming server 116 may support example aspects described herein of identifying current data (e.g., gameplay decisions) associated with a current gameplay session at a gaming device 108. The gaming server 116 may provide any of the historical data and/or current data to a machine learning engine 141 (e.g., as inputs to a data model(s) 142*a*, 142-*b*, 142-*c*, and 142-*d*, as training data 143, etc.), example aspects of which are described herein. In some aspects, gameplay decisions may be associated with decision events such as wager selections, gameplay choices (e.g., a player decision in a video poker game, selected pay lines at a slot machine, etc.), bonus/prize selections, etc.

In some aspects, the historical data may include sensor data associated with previous gameplay sessions (e.g., sensor data associated with previous gameplay decisions, previous decision events, previous gameplay results, etc.). The historical data may include previous post bonus and other player behaviors calculated and/or predicted (e.g., by the machine learning engine 141, using the data models 142-*a*, etc.) based on the gameplay and sensor data. In some aspects, the current data may include sensor data associated with current gameplay sessions (e.g., sensor data associated with current gameplay decisions, current decision events, current gameplay results, etc.).

In some examples, the game management instruction set 140 may enable the gaming server 116 to implement a reward program offering in accordance with the reward program offering configuration parameters output by the reward program model 142-*d*.

In some aspects, the gaming server 116 may support enabling the reward program offering using one or more baseline models described herein. The baseline model may be, for example, a baseline player behavior model, representative player behavior model, gaming system behavior model, and/or reward program model. In some aspects, one or more of the data models 142-*a*, 142-*b*, 142-*c*, and 142-*d* may be an example of a baseline model. In some other aspects, the gaming server 116 may support enabling a reward program offering using on a self-evolved model (e.g., an evolved or updated version of the baseline model) described herein.

The gaming server 116 may support example aspects described herein of outputting notifications associated with a reward program offering. For example, the gaming server 116 may output notifications indicating whether a reward program offering is available to the player, an indication of whether the reward program offering has been invoked and/or ended, etc. In some examples, for a reward program offering, the gaming server 116 may output notifications to gaming staff indicating predicted gameplay parameters associated with a player behavior model, representative player behavior model, gaming system behavior model, and/or reward program model applied to the reward program offering.

According to example aspects of the present disclosure, the processor 120 may utilize data stored in the memory 124 as a neural network. The neural network may be, for example, a machine learning network and may include a machine learning architecture. In some aspects, the neural network may be or include an artificial neural network (ANN). In some other aspects, the neural network may be or include any machine learning network such as, for example, a deep learning network, a convolutional neural network, a long-short term memory (LSTM) neural network, or the like. Some or all of instructions or instruction sets stored in the memory 125 and some functions of the gaming server 116, gaming devices 108, and/or communication devices 144 may be implemented using machine learning techniques. In some cases, the machine learning techniques may include deep learning and reinforcement learning. In some cases, the machine learning uses unsupervised learning techniques. Aspects of the present disclosure support modifying any portion of the neural network over time based on gameplay data (e.g., gameplay decisions, gameplay results, player behavior, etc.), sensor data (e.g., biometric data, etc.), player feedback (e.g., a questionnaire, etc.), etc.

In some aspects, the neural network may support various clustering algorithms, such as partitive (or centroidal) or hierarchical clustering, both of which separate data into groups whose members share maximum similarity as defined (typically) by a distance metric. In partitive clustering, clusters are represented by central vectors, distributions, or densities. There are numerous variations of partitive clustering algorithms, but some of the most common techniques include k-means, k-medoids, OPTICS, and affinity propagation. Hierarchical clustering involves creating clusters that have a predetermined ordering from top to bottom, and can be either agglomerative (clusters begin as single instances and iteratively aggregate by similarity until all belong to a single group) or divisive (the dataset is gradually partitioned, beginning with all instances and finishing with single instances).

For example, the neural network may support K-means clustering of training data 143, such as historic granular gameplay data 400 and/or summarized gameplay data 404. For example, the training data 143 may include gameplay data 400 and 404 and player behavior (e.g., player decisions) associated with previous gameplay sessions at gaming devices 108 (e.g., based on game type, based on a player profile, etc.). In some examples, the training data 143 may include gameplay data 400 and 404 and player behavior (e.g., player decisions) associated with a current gameplay session at a gaming device 108. For example, the training data 143 may include previous data (e.g., gameplay data, player behavior, gameplay decisions, etc.) from the same player as well as previous data (e.g., gameplay data, player behavior, gameplay decisions, etc.) from other players (e.g., similar players, players having similar player characteristics, etc.) in the venue. In some aspects, the training data 143 may include anonymous player information and/or data (e.g., not tracked by player identification information).

In an example, the training data 143 may include a dataset (e.g., gameplay data, player behavior, sensor data, calculated or predicted emotional states, etc.), and the neural network may implement a K-means algorithm which includes iteratively partitioning the dataset into K pre-defined, distinct, non-overlapping subgroups (also referred to herein as clusters or players) where each data point belongs to only one subgroup. In some cases, implementation of the K-means algorithm may include partitioning the dataset such that intra-cluster data points are as similar as possible (e.g., within a threshold criteria) while clusters are as different (e.g., far, in accordance with a threshold distance) as possible.

In an example, the clusters may be identifiable from the analyzed dataset (e.g., gameplay data) based on a set of features pre-defined at the gaming system 100. In some aspects, the gaming system 100 may support defining and/or modifying (e.g., redefining, reconfiguring) the set of features at the gaming server 116 or a communication device 144 (e.g., by a casino establishment, a casino manager, etc.).

Example features include any of the gameplay data 400 and 404 fields noted above. Alternative or additional features can include: a credit amount at the start of a gameplay session (e.g., 'SumCashInAmount'), a credit amount at the end of a gameplay session (e.g., 'SumCashOutAmount'), quantity of wager adjustments during a temporal period and/or during a gameplay session (e.g., 'No. of bet changes'), a ratio of a wager amount to a player bankroll (e.g., 'Wager-Bank-Ratio'), gameplay duration associated with gameplay session (e.g., 'TimePlayed'), average wager amount for a primary game (base game) (e.g., 'AverageWagerPrimary'), an average win amount associated with a primary game (e.g., 'AveragePrimaryWinAmount'), quantity of primary games played during a temporal period and/or during a gameplay session (e.g., 'No.PrimaryGames-Played'), quantity of secondary games (bonus games) played during a temporal period and/or during a gameplay session (e.g., 'No.SecondaryGamesPlayed), or the like. In some aspects, the example features may include sensor data (e.g., biometric data, pressure sensor data, etc.) associated with player gameplay session, wager amounts, gameplay sessions, primary games played, secondary games played, etc. It may also include non-gameplay information, such as a number of alcohol drinks consumed by a player, whether the player is alone or accompanied by others and a number of such companions, a customer or player ranking (e.g., gold, silver, bronze), and the like.

According to example aspects of the present disclosure, the individual or representative players described herein may be derived from gameplay data and/or sensor data associated with all players that play a given game. In some aspects, the gaming server 116 (e.g., machine learning engine 141) may generate players by clustering the gameplay data and/or sensor data of all players using specified attributes derived from the data. When a player plays a game (e.g., makes gameplay decisions during a gameplay session), the gaming server 116 (e.g., machine learning engine 141) may compare gameplay data and/or sensor data associated with the player to clusters of gameplay data and/or sensor data monitored by the AI system to determine which cluster the behavior of the player belongs to.

However, using granular EGM/VLT logs and data to train individual player behavior models can be easier to train a more sensitive model that can detect different players and their playstyles and more accurately identify, for each player, a reaction to bonus games and other earned rewards.

In some aspects, the neural network may generate an output including data summaries associated with each cluster. Each data summary may include an indication of any combination of features defined at the gaming system 100.

An example data summary for a cluster is below:

Summary of this Cluster:

- Percentage of sessions assigned to this cluster: 19.8%
- Number of wagers is greater than average.
- Sessions are longer than average.
- The average primary wagers were average.
- Wagers are the most correlated with cash (positive).
- Players played multiple games.
- Changed bet.
- Less than average possibility of cashing out after hitting a bonus in the game.
- Less than average possibility of changing the game after hitting a bonus in the game.
- Average time between spins is less than average.
- Standard deviation of time between spins is narrower than average.
- Intensity is higher than average.

Another example data summary for a cluster associated with post bonus behavior is below. In an example, the degree of similarity of bonus games and the reward program mechanism can lead to mapping a post bonus behavior to post reward program offering behavior. In other words, a player's increase of engagement after facing a bonus game means that they will likely do the same when facing a reward offering.

Summary of this Cluster:

- Bonus awarded.
- Type of bonus.
- Possibility of cashing out after hitting a bonus in the game.
- Possibility of changing the game after hitting a bonus in the game.
- Average time between spins.
- Standard deviation of time between spins.
- Intensity.
- Heart Rate.
- Body temperature changes.
- Voice/sound levels.
- Pressure sensor data (intensity of button press as detected by pressure sensor).
- Pulse rate.

The system 100 (e.g., subsystem thereof) may correlate gameplay data indicative of player behavior upon occurrence of a bonus award to the player during a gameplay session. The algorithms described herein may support the interpretation of the data (e.g., less the user). In an example, from the data, the system 100 (e.g., using an algorithm described herein) may identify that "if there is a bonus award, the player intensity level is significantly higher." In another example, the system 100 may identify the system 100 (e.g., using an algorithm described herein) may identify that "if there is a bonus award, the player intensity level is not significantly changed."

According to example aspects of the present disclosure, the gaming server 116 (e.g., machine learning engine 141) may use modeling algorithms (e.g., random forest models, neural network, other modeling algorithms, etc.) and training tools (such as Python ETL tools) and machine learning platforms and learning libraries (such as TensorFlow or PyTorch) for training of decision points of the data models 142 described herein. For example, the gaming server 116 may use random forest models for training of decision points of the data model 142-*a* (e.g., player behavior model) and/or the data model 142-*b* (e.g., representative player behavior model) and/or gaming system behavior model 142-*c* and/or reward program model 142-*d*. In some aspects, the gaming server 116 may train the decision points based on gameplay data (e.g., player handle pulls, player decisions, etc.) and/or sensor data (e.g., biometric data, pressure sensor data, etc.). In some aspects, the gaming system 100 may support incorporating additional models as additional data (e.g., additional or new research) for increasing the efficiency and accuracy associated with predictions by the data models 142.

The gaming server 116 may store the gameplay data and/or sensor data for a player according to a user identifier (e.g., corresponding to a player account with a casino, a gaming platform, etc.). In some aspects, the gaming server 116 may store the gameplay data and/or sensor data such that the identity of the player associated therewith is anonymous. The gaming server 116 may apply all historical data or a portion of the historical data to generate and/or train a data model 142.

In some aspects, to generate and/or train a data model 142 for a gaming device 108 (e.g., gaming device 108-*a*) of a first game type, the gaming server 116 (e.g., machine learning engine 141) may apply a first set of data acquired from gaming devices 108 of the first game type. In an example, the first game type may be pseudo-random number or random number generated (PRNG/RNG)-based game type.

Additionally, or alternatively, the gaming server 116 (e.g., machine learning engine 141) may apply a second set of data acquired from gaming devices 108 of a second game type (e.g., another PRNG/RNG-based game type) that is similar to the first game type. In an example, the second game type may have one or more features in common with the first game type. In some aspects, the data model 142 generated and/or trained for the gaming device 108 (e.g., gaming device 108-*a*) of the first game type may be used by both the gaming device 108 of the first game type and the gaming devices 108 of the second game type.

Additionally, or alternatively, the gaming server 116 (e.g., machine learning engine 141) may apply a third set of data acquired from gaming devices 108 of a third game type (e.g., an electronic table game, a skill-based game, a semi skill-based game, etc.) that is different from the first game type. In some aspects, the data model 142 generated and/or trained for the gaming device 108 (e.g., gaming device 108-*a*) of the first game type may be used by both the gaming device 108 of the first game type and the gaming devices 108 of the third game type.

The gaming system 100 may support the use of meta data tags. In an example, a gaming device 108 (or gaming server 116) may use a series of meta data tags to determine which data model(s) 142 are compatible for use with the gaming device 108. For example, the gaming device 108 (or gaming server 116) may determine which data model(s) 142 are compatible for use with a game type implemented at the gaming device 108.

In some aspects, training of the data model(s) 142 described herein may be implemented offline (e.g., once a gameplay session has been completed) and/or in real-time (e.g., based on a trigger condition such as a temporal duration, a quantity of completed gameplay decisions, a quantity of gameplay events, etc.). In an example, gameplay data and/or sensor data associated with a completed gameplay session (or collected based on a trigger condition) may be processed locally (e.g., at a gaming device 108) or may be sent and processed at the gaming server 116.

In some examples, the gameplay data and/or sensor data may be added to a total amount of data associated with a player. In an example aspect, the machine learning engine 141 (e.g., implemented at the gaming device 108 or the gaming server 116) may further train (e.g., retrain, modify, etc.) the data model(s) 142, using the added gameplay data and/or added sensor data.

In an example, the gaming server 116 may train (e.g., retain, modify, etc.) the data model(s) 142 using gameplay data and/or sensor data that was more recently captured or measured and compared to other gameplay data and/or sensor data. For example, by training the data model(s) 142 using gameplay data and/or sensor data that is relatively recent, the gaming server 116 may account for changes in gameplay patterns of a player that may occur over time.

In an example, the gaming server 116 may provide the data model(s) 142 with a "memory" over the last X events, where X is a variable parameter. Accordingly, for example, subsequent decisions and progress of evolvement of the data model(s) 142 may be based on previous events within one or throughout multiple gameplay sessions and visits.

In some aspects, the type of data (e.g., associated game type, associated gameplay market, etc.) used herein for training a data model(s) 142 may be of the same type (e.g., same game type, etc.) as the input data for generating (e.g., creating) the data model(s) 142.

Additionally, or alternatively, the type of data used for training a data model(s) 142 may be of a different type (e.g., different game type, etc.) as the input data for generating the data model(s) 142, for example, so as to enable "game portability testing." Accordingly, for example, aspects of the present disclosure support training a data model 142 based on a game of a first game type, but executing the data model 142 for different game types and/or different markets for game evaluation. In some aspects, once a data model 142 is built, the gaming system 100 may support training the data model 142 on any data set (e.g., any data set compatible with the data model 142). Thus, a data model 142 described herein can exhibit different behaviors based upon the data that the data model 142 was trained on.

In some examples, a data model 142 trained for one game can be tested to play a different game. In an example, the data model 142 may be used to verify how a model from one game type, gameplay market, player segment, etc. would perform with respect to another game type, gameplay market, player segment, etc. That is, aspects of the present disclosure support techniques for verifying the degree in which the data model 142 could perform across different games (e.g., game types), different markets, and/or different players.

In some aspects of the present disclosure, a data model(s) 142 described herein may reuse previously generated model output data as new input data. That is, for example, any of the data model(s) 142 described herein may support self-evolvement based on its own output (e.g., its own AI generated data). Accordingly, for example, the system 100 may be implemented with a goal of predicting as many sequences as possible using a relatively small (e.g., a few) generic playing transactions as input for a data model(s) 142. An example approach for predicting the sequences is to use a moving window as input for a data model(s) 142 to produce an output, for example, assuming that the sequences in the beginning of the gameplay session(s) are generic and belong to a player. As the data model(s) 142 predicts subsequent transactions, the input window may refrain from using authentic transactions (e.g., actual gameplay data), but synthetic ones already produced by the data model(s) 142. In some aspects, the system 100 may monitor a similarity between the synthetic outputs and the expected output, because at some point in time, the synthetic outputs may no longer match the expected output once the data model(s) 142 no longer has access to any authentic transactions. Another example approach may include producing a sequence instead of a single output, such that the data model(s) 142 may fall off (e.g., no longer match an expected output(s)) relatively later compared to the other example approach above. For example, aspects of the present disclosure may support discarding the authentic transactions such that authentic transactions that preserve information of the player are maintained (e.g., conservatively maintained) in the input window.

In some aspects, the data model(s) 142 may reuse an amount of the generated model output data such that the reused data is below a threshold data amount. In some aspects, the gaming server 116 (e.g., machine learning engine 141) may set the threshold amount such that any noise associated with reusing the generated model output data is below a noise threshold. That is, for example, the gaming server 116 (e.g., machine learning engine 141) may set the threshold data amount such that the generated model output data retains a similarity (e.g., within a threshold difference value) with training data.

In some aspects, the threshold data amount may be set based on the evaluation metric used for noisiness of the generated model output data. In an example, aspects of the present disclosure may support producing sequences (e.g., predictions) using the reused data until the produced output (e.g., additional generated model output data) becomes too irrelevant. For example, if the generated model output data no longer represents the playing pattern of a target player(s), the gaming server 116 may assume that the produced data is too noisy, and the gaming server 116 may refrain from reusing previous generated model output data.

In an example of noise measurement, the gaming server 116 may specify a distance metric that computes how different a predicted output(s) (e.g., as included in generated model output data) is with respect to an actual output(s) (e.g., as included in training data). Additionally, or alternatively, a data model(s) 142 implemented in the system 100 may constantly monitor produced sequences (e.g., predictions) and verify whether the produced sequences represent a target object (e.g., player, gaming system, or reward program offering). In an example, if the data model(s) 142 (also referred to herein as a monitor module) specifies that a sequence(s) no longer represents the target object (e.g., with respect to an accuracy threshold), the gaming server 116 may assume that the produced data is too noisy, and the gaming server 116 may modify the threshold data amount associated with the reused data and/or refrain from producing additional sequences.

The memory 124 may be configured to store program instructions (instruction sets) that are executable by the processor 120 and provide functionality of a machine learning engine 141. The memory 124 may also be configured to store data or information that is useable or capable of being called by the instructions stored in memory 124. One example of data that may be stored in memory 124 for use by components thereof is a data model(s) 142 and/or training data 143. The data model(s) 142 may be a neural network model. The training data 143 may include training data and feedback.

The machine learning engine 141 may include a single engine or multiple engines. The gaming server 116 (e.g., the machine learning engine 141) may utilize one or more data models 142 for recognizing and processing information obtained from gaming devices 108, communication devices 144, other servers, and/or databases (e.g., player profile database 148, gaming device database 154, ticket/voucher database 152). In some aspects, the gaming server 116 (e.g., the machine learning engine 141) may update one or more data models 142 based on learned information included in the training data 143. In some aspects, the machine learning engine 141 and the data models 142 may support forward learning based on the training data 143. The machine learning engine 141 may have access to and use one or more data models 142. For example, the data model(s) 142 may be built and updated by the machine learning engine 141 based on the training data 143. The data model(s) 142 may be provided in any number of formats or forms. Non-limiting examples of the data model(s) 142 include autoregressive models, Decision Trees, Random Forest, Support Vector Machines (SVMs), Nearest Neighbor, and/or Bayesian classifiers. The machine learning engine 141 and/or the data models 142 may be implemented at any of a gaming device(s) 108, a gaming server(s) 116, and/or a communication device(s) 144 described herein.

In some aspects, the data model(s) 142 may support features for self-evolving (also referred to herein as self-learning). For example, the data model(s) 142 may be self-learning AI models capable of self-training using unlabeled data sets. In an example, the unlabeled data sets may include data (e.g., gameplay data, sensor data, etc.) that has not been tagged with labels identifying characteristics, properties, or classifications. In some aspects, the data model(s) 142 may analyze unlabeled datasets and identify, from the data included in the datasets, patterns that the data model(s) 142 can draw conclusions from. For example, the patterns may indicate a correlation between gameplay decisions and emotional states associated with a player. Accordingly, for example, aspects of the present disclosure may support data models capable of being self-trained for cases in which a large amount of training data is not available. Example aspects of self-evolving may incorporate example K-means clustering/algorithms described herein.

The training data 143 may include any data managed by the gaming server 116 with respect to the ticket/voucher management instruction set 132, the player profile management instruction set 136, and/or the game management instruction set 140 described herein. For example, the training data 143 may include player histories (e.g., gameplay data, player behavior, sensor data, emotional states, etc.) associated with gameplay sessions at a gaming device(s) 108. In some aspects, the training data 143 may be stored (e.g., in the memory 124, a database, etc.) according to player profile and/or game type.

In some examples, the training data 143 may include player histories (e.g., gameplay data, player behavior, sensor data, etc.) associated with earning or receiving a bonus game or reward. In some other examples, the training data 143 may include player histories associated with previously invoked reward program offerings. In some other examples, the training data 143 may include player histories associated with previous gameplay decisions (e.g., a decision to gamble, a wager amount, quantity of lines played, a decision to make a bet dependent on another bet outcome (e.g., place a side bet), etc.). In some aspects, the machine learning engine 141 may be configured to analyze aggregated player histories, and/or gameplay data, that are historical or in real-time.

Aspects of the present disclosure may support evolvement of the data model(s) 142 in association with gameplay data of a player(s) (e.g., identified by a personal identifier or an anonymous player identifier). In some aspects, a baseline model may evolve differently in accordance with different respective players, gameplay data associated with the players, sensor data (e.g., biometric data, pressure sensor data, etc.) associated with the players, gameplay behavior associated with the players, etc.

In some aspects, the gaming system 100 may support data collection in which data (e.g., gameplay data, sensor data, etc.) is collected directly via a gaming device 108 associated with a player and a gameplay session. In some aspects, the data may be collected via a central game management system, a player tracking system, a casino management system, a controller/data aggregator (e.g., iLink-type device), or the like. For example, the gaming device 108 may track every input made by the player is tracked and bypassed to feed an existing player behavior (e.g., an existing baseline model). The tracked inputs may include active inputs (e.g., a gameplay decision, a button press, a handle pull, etc.) and/or passive inputs (e.g., a measured biometric parameter) In some examples, the gaming device 108 may track and forward gameplay results (e.g., resulting game outcomes) to the player behavior. Accordingly, for example, the player behavior receives data provided by a player (e.g., gameplay data such as player inputs, sensor data such as biometric data, etc.) and gameplay results (e.g., outputs from the gaming device 108).

The data provided by the player and the gameplay results provided by the gaming device 108 is useful for AI/machine learning, as such data is very raw data that is a 1:1 reflection (correlation) of every single player action to a corresponding achieved game output (gameplay result). Aspects of the present disclosure include collecting all data (e.g., data provided by the player, gameplay results provided by the gaming device 108, etc.), filtering a portion of the data and processing the same by the AI, and storing and incorporating the AI-processed data into a player behavior (e.g., so as to evolve the player behavior).

In some aspects, evolvement and/or training (retraining) of a data model(s) 142 (e.g., player behavior) may be implemented using other input types. For example, aspects of the present disclosure may include collecting and considering data from online casino games (e.g., gameplay sessions at a communication device 144 such as a mobile device or personal computer). In an example, the gaming server 116 (e.g., machine learning engine 141) may differentiate between data collected when the player starts playing a game (e.g., a slot game) at a gaming device 108 at a casino venue and data collected when the player continues playing the same game online (e.g., using a communication device 144).

Accordingly, for example, the gaming server 116 (e.g., machine learning engine 141) may generate data model(s) 142 (e.g., player behaviors) capable of identifying differences in player behavior and/or reward offering outcomes with respect to instances of casino gaming and mobile gaming. In some aspects, the gaming server 116 (e.g., using the machine learning engine 141 and the data model(s) 142) may provide reward offerings that correspond to historical gameplay data, gameplay behavior, and/or sensor data associated with a player, in which the reward offerings may be provided based on the type of device (e.g., a gaming device 108 at a casino venue, a communication device 144 used for mobile gaming, etc.) associated with a gameplay session. Stated differently, the reward offering configuration parameters may depend upon gaming device type and may be different for a gaming device 108 compared to a communication device 144.

In some examples, a player behavior may correspond to a player behavior corresponding to a player profile. For example, the gaming system 100 may support player behaviors which implement gameplay decisions and/or gameplay patterns that correspond to respective players of different player profiles (e.g., different players). For example, a player behavior model corresponding to a player profile may be trained (e.g., at the gaming server 116, the machine learning engine 141, etc.) based on previous and/or current gameplay decisions by a player associated with the player profile.

The player behavior models may be built to represent "common player behaviors" derived from K-means clustering of previous (e.g., pre-collected) gameplay data and gameplay behaviors. The player behavior models may support fully-autonomous and/or semi-autonomous gameplay at a gaming device 108 according to certain player-like play behaviors.

In an example, the player behavior models, representative player behavior, gaming system behavior model, and/or reward program model may be provided (e.g., by the gaming server 116, a communication device 144, a gaming device 108) with a "memory" over past gaming events (e.g., the last X events, where X may be a variable parameter value). In an example, for a gameplay session at a gaming device 108, subsequent decisions by the player behavior model may be based on previous events (e.g., previous gameplay decisions by the player behavior model, previous gameplay decisions by a player, a gameplay result associated with a previous gameplay decision, etc.) in the gameplay session.

For example, each player behavior model, representative player behavior model, and gaming system behavior model may have its own prediction algorithm such as decision tree or neural network. In an example, reflecting previous events, each player behavior model may execute decisions according to its own decision tree or random forest to perform an action (e.g., a gameplay decision). Accordingly, for example, each player behavior model, representative player behavior model, and gaming system behavior model may include "memory capabilities" to reflect and analyze previous gameplay events and make a gameplay decision (e.g., a wager amount, a quantity of lines to play, a side bet, etc.), for upcoming gameplay events based upon the same.

In some aspects, the AI mechanisms (e.g., machine learning engine 141, data model(s) 142, etc.) detecting a player's behavior model may include self-learning capabilities based on both real-time events (e.g., game events, gameplay decisions, gameplay results, decision events, etc.) associated with a game and smart sensory data (e.g., biometric data, etc.) derived from scanning the player using a sensor(s) 145. That is, for example, the AI mechanisms may incorporate algorithms capable of predicting player satisfaction in real-time based on real-time events, satisfaction history of the player, and/or satisfaction history of similar players (e.g., analyzed from historically collected gameplay data and/or sensor data).

In some examples, the AI may generate player behavior models based on previous gameplay sessions associated with the same player, previous gameplay sessions associated with players of a similar type (e.g., players associated with an entertainment player, a 'high roller' player, a 'jackpot hunter' player, etc.), previous gameplay sessions associated with similar markets (e.g., markets having overlapping characteristics), previous gameplay sessions associated with similar venues (e.g., venues having overlapping characteristics), etc.

The behavior models may be developed, generated, and/or trained (e.g., by the gaming server 116, a communication device 144, etc.) using a data-driven approach or other machine learning techniques including deep learning and re-enforcement learning.

In some cases, the player and representative behavior models may be generated to mimic human behavior corresponding to a player and/or human behavior corresponding to a player. In an example, a player or representative player behavior model would receive game results, player-behavioral habits, and sensor data (e.g., biometric data, pressure sensor data, etc.), reflect on and analyze such information, and act on the results (e.g., generate and provide a prediction described herein, self-evolve based on the results as described herein, etc.).

The machine learning engine 141 may build any number of configuration profiles (e.g., player profiles, gaming device 108 profiles, player profiles) using automatic processing, using artificial intelligence and/or using input from one or more users associated with the communication device 144. The machine learning engine 141 may use automatic processing, artificial intelligence, and/or inputs from one or more users of the communication devices 144 to determine, manage, and/or combine information relevant to a configuration profile. Example aspects of such configuration profiles are described in further detail below.

The machine learning engine 141 may determine configuration profile information based on a user's interactions with information. The machine learning engine 141 may update (e.g., continuously, periodically, etc.) configuration profiles based on new information that is relevant. The machine learning engine 141 may receive new information from any communication device 144, the gaming server 116, any database described herein, etc. Profile information may be organized and classified in various manners. In some aspects, the organization and classification of configuration profile information may be determined by automatic processing, by artificial intelligence and/or by one or more users of a communication device 144 (e.g., a player, casino personnel, a casino manager, etc.).

In an example, the gaming server 116, a gaming device 108 and/or a communication device 144 may provide, to the machine learning engine 141, gameplay data (e.g., a gameplay decision, a gameplay result, and other gameplay data noted above) and/or user information associated with a gameplay session (e.g., previous or current) at the gaming device 108. In some examples, the user information may include player identification information (e.g., stored on a player identification card, associated with a player access code, stored on a communication device 144 of a player, etc.). In some other examples, the user information may include a player behavior stored on a communication device 144 or other device (e.g., a portable memory device) of a player.

For example, the machine learning engine 141 may identify a gameplay pattern associated with the gameplay decisions, and the machine learning engine 141 may identify a player behavior model that corresponds to the gameplay pattern. In an example, the machine learning engine 141 may compare the gameplay pattern to gameplay patterns associated with a set of player behavior models (e.g., data model(s) 142).

Further, for example, the machine learning engine 141 may process the gameplay decisions and the sensor data using the identified player behavior model. The gaming server 116 (e.g., using the machine learning engine 141 and the player behavior model) may compare the gameplay decisions to previous gameplay decisions (also referred to herein as historical actions and/or historical decisions) by the player, for example, as represented by the player behavior.

In an example, the gaming server 116 may determine that there is a match between the gameplay decision and a previous gameplay decision (e.g., with respect to similar gameplay conditions). The gaming server may add the gameplay decision to a history (e.g., implemented at a database or memory) of previous gameplay decisions (also referred to herein as historical recordings) so as to establish and/or verify accuracy of an applied data model(s) 142 (e.g., an applied player behavior) with respect to the gameplay decision.

Additionally, or alternatively, the gaming server 116 may determine that there is not a match between the gameplay decision and a previous gameplay decision (e.g., the action is the different from a previous decision(s) under similar gameplay conditions, the action exceeds a similarity or determinate threshold with respect to the previous decision (s), the action is different from and/or exceeds the similarity threshold with respect to a decision predicted by the gaming server 116, etc.). The gaming server 116 (e.g., using the machine learning engine 141) may apply learning techniques associated with identifying the reason of the mismatch. For example, the gaming server 116 may identify whether the mismatch is a result of a spontaneous or non-rational decision by the player, a general behavioral shift of the player (e.g., as determined based on biometric data, etc.). In some aspects, the gaming server 116 may identify behavioral changes (e.g., potential new behaviors, behavioral shifts, etc.) associated with the player, and the gaming server 116 may modify the player behavior based on behavioral changes.

In an example, for a gameplay session associated with a player and the gaming device 108, the machine learning network may generate an output inclusive of probability information and confidence information corresponding to modifying a model. The probability information may include a probability score (e.g., from 0.00 to 1.00) associated with a predicted parameter value(s). The confidence information may include a confidence score (e.g., from 0.00 to 1.00) corresponding to the probability score(s).

For example, the gaming server 116 (e.g., machine learning engine 141) may determine a probability score for modifying a model based on a correlation between actual behavior and behavior predicted by the model. In some examples, the machine learning engine 141 may output a relatively low probability score for modifying the model for cases in which the machine learning engine 141 identifies relatively high correlation (e.g., above a threshold) between the actual behaviors. In some other examples, the machine learning engine 141 may output a relatively high probability score for modifying the model for cases in which the machine learning engine 141 identifies a relatively low correlation (e.g., below a threshold) between the behaviors.

In another example, the gaming server 116 (e.g., machine learning engine 141) may determine a probability score for modifying the player behavior based on post bonus behavior of the player with respect to a previous gameplay event (e.g., a previous gameplay decision event, a previous gameplay decision, a previous gameplay result, etc.) and the post bonus behavior of the player with respect to a subsequent gameplay event (e.g., a subsequent gameplay decision event, a subsequent gameplay decision, a subsequent gameplay result, etc.). In some examples, the machine learning engine 141 may output a relatively low probability score for modifying the player behavior for cases in which the machine learning engine 141 identifies no change or a relatively small change (e.g., positive or negative change, below a threshold) to the post bonus behavior of the player. In some other examples, the machine learning engine 141 may output a relatively high probability score for modifying the player behavior for cases in which the machine learning engine 141 identifies a relatively high change (e.g., positive or negative change, greater than or equal to the threshold) to the post bonus behavior of the player.

The machine learning engine 141 may create, select, and execute appropriate processing decisions. Example processing decisions may include setting parameters of a reward program offering, invoking the reward program offering at a set of gaming devices, or the like.

Other example processing decisions include providing an output indicating whether to modify a model (e.g., modify parameters of the model). Some example processing decisions include modifying the parameters of the model.

Data within the database of the memory 124 may be updated, revised, edited, or deleted by the machine learning engine 141. In some aspects, the machine learning engine 141 may support continuous, periodic, and/or batch fetching of data (e.g., from gaming devices 108, communication devices 144, databases, servers, etc.) and data aggregation.

In some aspects, the gaming system model 142-*c* comprises a locational tracking and visualization component for each gaming device 108 that presents a map of the gaming system (e.g., casino floor) and a spatial location and status of each of the gaming devices, in real-time, reflecting what is going on in the reward program. This map could be provided to the operator only, or nicely presented to players using the gaming system (e.g., among the casino floor) to enable all players to track the reward progression.

EXAMPLE ASPECTS AND IMPLEMENTATIONS

With a trained model (e.g., data model 142, a trained player behavior model, a trained representative player behavior model, a trained gaming system behavior model, or a trained reward program model) described herein, data that is generated by a player or gaming system as well as the state of a gameplay session (e.g., gameplay results, gameplay events, etc.) are fed into a model predictor function. The data may include sensor data (such as biometric data), gameplay decisions, etc. The model predictor function may be implemented by the machine learning engine 141 and the trained model. The model predictor function may generate a prediction which will include an action prediction as well as other values and features which correspond to the predicted action. The gaming server 116 (e.g., machine learning engine 141) may transmit an indication of the predicted action to another model and/or the gaming device 108.

In some examples, the gaming system 100 may support an auto play mode in which a gameplay session at a gaming device 108 is configured on behalf of a player, based on an applied player behavior. In some cases, the configuration may be based on game type (e.g., video poker, slot machine, etc.). In some aspects, the configuration may include preferred settings (e.g., gameplay settings, gaming device settings, etc.) of the player. In some aspects, the gaming system 100 may support autonomous and/or semi-autonomous wager modifications (e.g., increases, decreases) at a gaming device 108 based on an applied player behavior and a result associated with a gameplay decision (e.g., game outcome). The auto-play mode could be combined with a reward offering. For example, the particular player's player behavior model, when the player is deemed eligible, could play a gameplay session and reward program offering session on the player's behalf. The player behavior model corresponding to the player is trained based on the corresponding player's playstyle and would auto-play the gameplay session substantially in the same manner as the player.

The gaming system 100 may be a central system linked with a casino establishment, a central system linked with a consortium of casino establishments, or the like. The gaming system 100 may support the aggregation, sharing, and exchange of data by devices (e.g., gaming devices 108, gaming servers 116, communication devices 144, databases, etc.) included in the gaming system 100.

For example, the gaming system 100 may be fed portions of gameplay data (e.g., gameplay decisions) associated with gameplay sessions at devices included in the gaming system 100, based on which the gaming server 116 may generate player behaviors described herein. For example, the player behaviors may include prediction profiles indicative of information such as "players who did this, also did that." Via gameplay data gathered and analyzed with respect to gameplay sessions, generated player behaviors may be distributed among devices (e.g., gaming devices 108, gaming servers 116, communication devices 144, etc.). For example, the generated player behaviors and associated prediction profiles and may be selectable/modifiable/implemented by a player for an auto play mode at a gaming device 108. In some aspects, the gaming system 100 may support player inputs associated with manually overwriting (e.g., modifying) any portion of model characteristics of the player behavior models generated by the gaming server 116. For example, the gaming system 100 may support viewing of generated and/or available player behavior models, selection of the player behavior models, and modification of pre-set model characteristics of the player behavior models.

In another example implementation, the gaming system 100 may support adjustments and/or customizations (e.g., manually by the player, gaming operator, autonomously or semi-autonomously by the machine learning engine 141, etc.) to parameters associated with a model. An example parameter may include a threshold condition associated with automatically triggering an action (e.g., invoking a reward program offering, modifying a current player behavior applied to a gameplay session, modifying the representative player behavior model, modifying the gaming system behavior model, modifying the reward program model, etc.). Some example criteria associated with triggering an action include temporal duration, credits earned, credits lost, net credits earned/lost compared to the credits available at the start of the gameplay session, winning streaks, losing streaks, and a threshold value assigned to any other gameplay data referenced herein.

In another example implementation, creating the initial baseline model may include training the baseline model by processing historical gameplay data (e.g., previous gameplay decisions, gameplay results, etc.) of an object (e.g., player, representative player, or gaming system) for which the baseline model will be created. In some aspects, the historical gameplay data may be tracked via a casino system (e.g., using a unique player identifier associated with a target player). As an example, the baseline model may perform (e.g., make gameplay decisions, etc.) such that the baseline model closely behaves like the target player.

Aspects of the initial baseline model may be different from other techniques in which a player behavior is trained until enough gameplay data (e.g., multiple thousands of gameplay sessions) is available with respect to the target player. For example, training of the initial baseline model may include relatively less gameplay data compared to the amount of gameplay data (e.g., thousands of gameplay sessions) associated with other model training techniques. For example, aspects of the present disclosure include training an initial baseline model and performing categorization (e.g. evaluate an accuracy percentage level according to different model actions). If the accuracy percentage level associated with the baseline model is greater than or equal to a threshold percentage, the baseline model may be deployed as described herein. If not, aspects of the present disclosure include retraining the baseline model on a larger data set(s), utilizing larger random forest trees (RFTs), and/or modifying other settings of algorithms associated with the initial baseline model.

In some aspects, training of the initial baseline model may be performed in association with training specifications that are based on the size of data (e.g., training data) available. In an example, after training of the initial baseline model, the initial baseline model may be applied to generate a prediction (e.g., gameplay decision, gameplay outcome, etc.) during a gameplay session. Upfront, the initial baseline model predicts what will happen in an event X. Once the event X occurs, the gaming server 116 may compare the actual outcome associated with the event X to the predicted outcome. The gaming server 116 may continuously compare actual outcomes to predicted outcomes, which may support continuously measuring the accuracy of the model.

In some aspects, training of a baseline model may include a first training of a first initial baseline model, testing the initial baseline model (e.g., seeing predicted values), a second training of an initial baseline model (or retraining of the initial baseline model), testing the second initial baseline model, and determining a percentage delta between the different initial baseline models. Based on the comparison, for example, the gaming server 116 may determine a stability and/or accuracy associated with the models. Accordingly, for example, aspects of the present disclosure may support evaluating a dynamic tendency (e.g., a dynamic percentage), based on multiple comparisons. For example, if the change between the first training and the second is below a threshold (e.g., below 20%), the gaming server 116 may determine that the training data is accurate enough for training the initial baseline models.

In some other cases, however, there may not be enough historical gameplay data to complete the creation and/or training of the baseline model. For example, the quantity of recorded gameplay decisions by the target object (e.g., player, representative player or gaming system) may be less than to a second (higher) threshold quantity for gameplay decisions. In another example, the quantity of recorded gameplay sessions by the target object may be less than a second (higher) threshold quantity for gameplay sessions, a cumulative duration associated with gameplay sessions by the target object is less than a second (higher) threshold duration, etc.

In an example, the gaming server 116 (e.g., machine learning engine 141) may create and/or train the baseline model using gameplay data, in which a portion (e.g., X %, as much data as available or previously captured) of the gameplay data is from the target object and a remaining portion (e.g., Y %) of the gameplay data is from a different target object, such as a different player or different gaming system. For example, the gaming server 116 (e.g., machine learning engine 141) may create and/or train the baseline model using gameplay data from the target player and the other players, in which: the total quantity of recorded gameplay decisions (by the player and the other players) is greater than or equal to a threshold the second (higher) threshold quantity for gameplay decisions; the total quantity of recorded gameplay sessions (by the player and the other players) is greater than or equal to a threshold the second (higher) threshold quantity for gameplay sessions; and/or the total cumulative duration associated with gameplay sessions (by the player and the other players) is greater than or equal to a threshold the second (higher) threshold duration.

Accordingly, for example, in the case in which the quantity of recorded gameplay decisions by the target object is less than a second (higher) threshold quantity for gameplay decisions, aspects of the present disclosure may support using "missing" data based on a "usual" or "average" or "similar" player or gaming system. For example, the gaming server 116 may apply as much data as available from a specific cluster/player and fill it with "default"/"similar" behavior so as to meet the second (higher) threshold and provide an initial baseline model. Then, over time, the accuracy of the model may be increased as additional input data (e.g., gameplay data, sensor data, etc.) is acquired. In some aspects, the accuracy of the model may be determined based on a percentage delta (e.g., a dynamic percentage) as described above.

In some aspects, the baseline models described herein may be venue-based. For example, a venue (e.g., a casino venue, a video lottery venue, an online gaming venue, an amusement with prize venue, etc.) may track gameplay behaviors for all players (e.g., all registered players, all non-registered players, etc.) and gaming devices. Using the gameplay behaviors for all players and gaming devices, the gaming server 116 (e.g., machine learning engine 141) may create and train a "standard baseline model" (e.g., representative player and/or gaming system behavior model) associated with the venue. Accordingly, for example, when creating a new baseline model for a player, the gaming server 116 (e.g., machine learning engine 141) may train the baseline model based on the "standard baseline model."

Aspects of the present disclosure may support validating (e.g., verifying) a baseline model using player or operator feedback. In an example, the baseline model may be validated based on player or operator feedback associated with performance results of the baseline model. For example, a player may evaluate the baseline model based on whether recommended actions (e.g., proposed gameplay decisions by the baseline model) by the gameplay model, gameplay results achieved by the baseline model, etc. are satisfactory to (e.g., approved by) the player In another example implementation, the gaming system 100 may support different models available for the same target object based on game type and/or gaming device 108. In some aspects, the gaming system 100 may support the application of different models across different game types.

For example, the gaming system 100 may support different respective models (e.g., baseline models, player behavior models, representative player behavior models, gaming system models, and reward program models) for electronic slot games vs. partial-electronic stepper games vs. other gaming machine-like devices. In an example, the gaming system 100 may support models (baseline models, player behavior models, representative player behavior models, gaming system models, and reward program models) that are tied towards themes of respective games. For example, the gaming system 100 may support a model(s) specific to a game "Ghost Busters" and a different model(s) specific to a game "American gods".

The communication device 144 may include a machine learning engine capable of implementing the stored player behaviors. For example, the communication device 144 may include a machine learning engine that includes aspects of the machine learning engine 141 described herein. In an example, a player behavior model in the communication device 144 of the player may output predictions to the reward program model stored in the gaming system. The mobile application may support the viewing, creation, and/or configuration of player behavior models by a player.

In an example, the mobile application may support reviewing characteristics or "personalities" associated with each player behavior model. For example, the mobile application may support assignment (e.g., by a player) of identification information such as names, avatars, images, etc. to the player behavior models. In some other aspects, the mobile application may support viewing, creation, and/or configuration of characteristic data corresponding to the player behavior models. For example, the mobile application may support fine-tuning (e.g., by the player, a casino operator, etc.) of one or more behavioral parameters of a player behavior model. The characteristics or "personalities" can be used to customize the reward indicator to further encourage high level of player participation. Each eligible player could thus have a different set of visual and audible settings (e.g., different avatars) that are used when the reward indicator moves to his respective gaming device.

In some other cases, the characteristic data may include usage data and/or performance data of with respect to a player behavior model, provided by the gaming server 116, the gaming device 108, and/or a communication device 144. For example, the usage data may include temporal information and/or usage information (e.g., dates/times a player behavior model was used, how often a player behavior model has been used within a temporal period, game types for which a player behavior has been applied) associated with each player behavior.

Aspects of the present disclosure may be applied to game types other than those associated with gaming devices 108. For example, the gaming system 100 may support application of the various models described herein to a sports betting environment. In some aspects, the gaming server 116 (e.g., machine learning engine 141) may support processing any combination of data associated with a sporting event (e.g., athlete performance, athlete performance statistics, team performance, team statistics, previous game results, etc.) and player decisions (e.g., wager amounts, wager parameters, etc.) associated with the sporting event. The gaming server 116 may generate any number of player behavior models corresponding to player decisions in relation to a sporting event. In some cases, the gaming system 100 may support proposed gameplay decisions associated with sports wagers such as micro events (e.g., micro-betting).

Figure 2B:
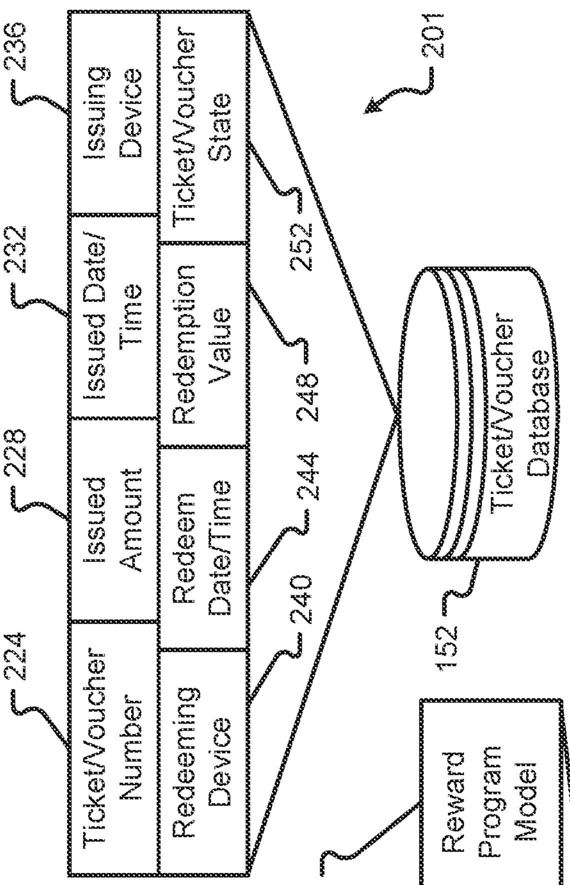
FIG. 2B is a block diagram illustrating a second example data structure used in accordance with aspects of the present disclosure.
Figure 2A:
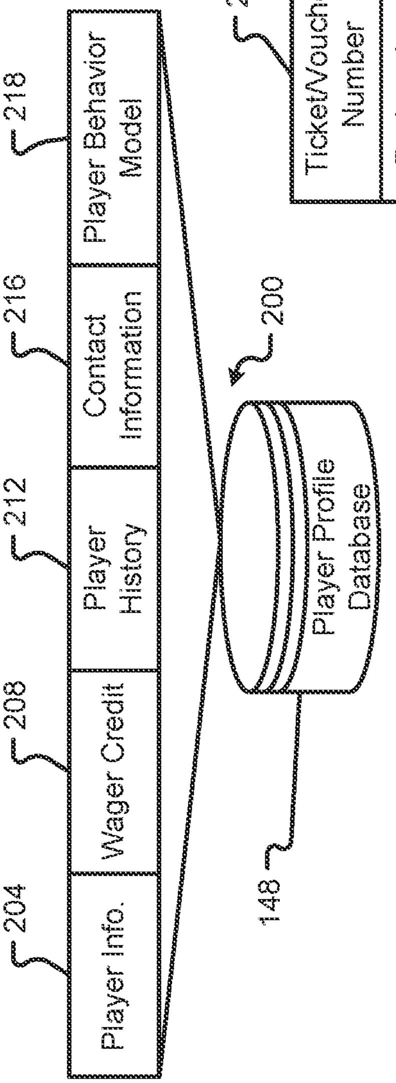
FIG. 2A is a block diagram illustrating a first example data structure used in accordance with aspects of the present disclosure.
Figure 2C:
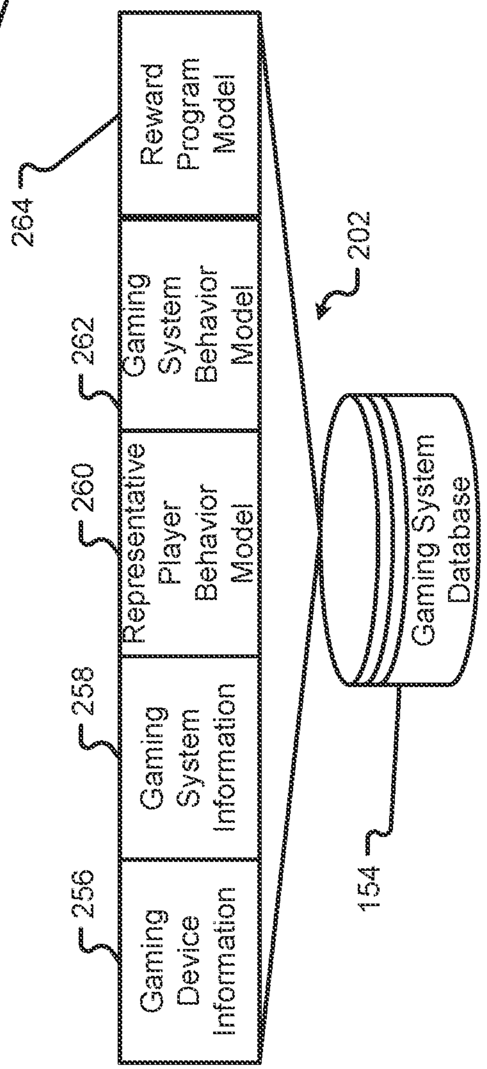
FIG. 2C is a block diagram illustrating a third example data structure used in accordance with aspects of the present disclosure.

With reference now to FIGS. 2A through 2C, additional details of data structures that are useable in connection with managing the various models (e.g., baseline models, self-evolving player behaviors, modified player behaviors) discussed herein will be described in accordance with at least some embodiments of the present disclosure. It should be appreciated that the data structures depicted and described herein may be stored within a central database or may be distributed among a number of data storage nodes. Alternatively or additionally, some or all of the fields of the data structures may be maintained in devices of the gaming system 100 such as the gaming server 116, a gaming device 108, and/or a communication device 144 without departing from the scope of the present disclosure.

With reference initially to FIG. 2A, details of a data structure 200 that may be maintained as part of a player profile will be described in accordance with at least some embodiments of the present disclosure. The database 148 may be configured to store one or multiple data structures 200 that are used in connection with tracking player progress and gaming history. In some embodiments, the data stored in the data structure 200 may be stored for a plurality of different player profiles or for a single player profile. As a non-limiting example, the data structure 200 may be used to store player loyalty information, player history information, and the like. Even more specifically, the data structure 200 may include a plurality of data fields that include, for instance, a player information field 204, a wager credit field 208, a player history field 212, a contact information field 216, and a player behavior field 218.

The player information field 204 may be used to store any type of information that identifies a player or a group of players. In some embodiments, the player information field 204 may store one or more of username information for a player 112, password information for a player account, player status information, accommodations associated with the player 112, and any other type of customer service management data that may be stored with respect to a player 112.

The wager credit field 208 may be used to store data about the available credit of a player 112 with a device, with a sports book, with a casino, and/or with a plurality of casinos. For instance, the wager credit field 208 may store an electronic record of available credit in the player's account and whether any restrictions are associated with such credit. The wager credit field 208 may further store information describing a player's available credit over time, cash out events for the player, winning events for the player 112, wagers placed by the player 112, tickets/vouchers issued to the player 112, and the like.

The player history field 212 may be used to store historical data for events that occur with respect to the player 112 (e.g., granular or summarized gameplay data associated with gameplay sessions of the player 112). For example, the player history field 212 may store information associated with the player 112 in relation to an outcome in a game of chance, an outcome in a game of skill, a celebration event for a person other than the player 112, involvement in a celebration event, visits to a predetermined location, gameplay information with respect to a particular game, player interactions with a communication device 144, player interactions (e.g., gameplay decisions, player feedback with respect to a baseline player behavior, etc.) with a gaming device 108, wagers placed by the player 112, tickets/vouchers issued for the player 112, tickets/vouchers redeemed by the player 112, etc. In some other examples, the player history field 212 may store granular and/or summarized gameplay data from gameplay sessions of the corresponding player 112.

In some aspects, the player history field 212 may store sensor data (e.g., biometric data, pressure sensor data, etc. described herein) associated with a player in relation to gameplay sessions. For example, the player history field 212 may store sensor data associated with gameplay data (e.g., gameplay behavior, gameplay decisions, etc.) and/or gameplay events (e.g., gameplay decision events, gameplay outcomes, gameplay recommendations or predictions by a player behavior model linked to the player, etc.).

The contact information field 216 may store information associated with a preferred mode(s) of contact for the player 112 and how such contact can be made. For instance, the contact information field 216 may store information such as an email address, phone number, room number, player loyalty number, address, etc.

The player behavior model field 218 may store user decisions by the player 112 and predictions by the player behavior model and hyperparameters and tunable parameters of the player behavior model. The field 218 may include a list of player behavior models associated with the player profile. For example, the player behavior model field 218 may include a list of stored player behavior models (e.g., stored at the memory 124 of the gaming server 116, stored at the player profile database 148, stored at the gaming device database 154, etc.). In some examples, for a player behavior model stored at a communication device 144 of the player 112, the player behavior model field 218 may include identifying information associated with the player behavior model, without the model data included in the player behavior model.

In some aspects, the player behavior model field 218 may store data (e.g., characteristics, features, use history, modifications, etc.) associated with player behavior models described herein. For example, the player behavior model field 218 may store data associated with baseline models, modified versions of the player behavior models, or the like. In some examples, the player behavior model field 218 may store accuracy information associated with predictions generated by a player behavior model with respect to an action (e.g., a proposed gameplay decision, predicted gameplay behavior, etc.). In some embodiments, the field 218 may store output or predictions of the player behavior model for the player 112.

With reference now to FIG. 2B, details of another data structure 201 that may be used within the gaming system 100 will be described in accordance with at least some embodiments of the present disclosure. The database 152 may be configured to store one or multiple data structures 201 that are used in connection with tracking ticket/voucher status, value, and the like. In some cases, the data structures 201 may be used in connection with tracking credits associated with a gameplay session at a gaming device 108. In some other cases, the data structures 201 may be used in connection with tracking credits, bonuses, and rewards earned and/or credits lost at a gaming device 108. In some other cases, the data structures 201 may be used in connection with tracking credits earned and/or credits lost at a gaming device 108 in association with different reward program offerings.

In some embodiments, the data stored in the data structure 201 may be stored for a plurality of different tickets/vouchers and may or may not be organized based on events, player association, etc. As a non-limiting example, the data structure 201 may be used to store ticket/voucher status information, ticket/voucher value information, and the like. The ticket/voucher value information may include credit information associated with a gameplay session at a gaming device 108.

In an example, the data structure 201 may include a plurality of data fields that include, for instance, a ticket/voucher number field 224, an issued amount field 228, an issued date/time field 232, an issuing device field 236, a redeeming device field 240, a redeem date/time field 244, a redemption value field 248, and a ticket/voucher state field 252. It should be appreciated that the data structure 201 may have greater or fewer fields than depicted in FIG. 2B.

The ticket/voucher number field 224 may be used to store a unique validation number assigned to the ticket/voucher when a ticket/voucher is issued to a player 112.

The issued amount field 228 may be used to store an electronic record of a monetary value for which the particular ticket/voucher was issued.

In some embodiments, the date/time field 232 may be populated based on a clock of the gaming device 108 that issued the ticket/voucher rather than relying on the clock of the gaming server 116. Said another way, when a gaming device 108 issues a ticket/voucher, such information may be communicated back to the gaming server 116 along with a timestamp provided by the gaming device 108 to indicate a time at which the gaming device 108 issued the ticket/voucher.

The issuing device field 236 may store information describing where a ticket/voucher is issued whereas the issued date/time field 232 may store information describing when a ticket/voucher is issued. For instance, the issuing device field 236 may indicate a unique serial number assigned to a gaming device 108 that was used to issue the ticket/voucher to the player 112 and the issued date/time field 232 may store the time at which the ticket/voucher was issued by the gaming server 116 and/or the gaming device 108.

Like the issuing device field 236, the redeeming device field 240 may be used to store information describing a device at which a ticket/voucher is redeemed by a player 112. A player 112 may redeem a ticket/voucher at a gaming device 108 by inserting a printed ticket/voucher into a ticket acceptance device of the gaming device 108 (e.g., similar to a bill acceptor). A player 112 may redeem a ticket/voucher at a communication device 144 by scanning the ticket/voucher with a camera of the communication device 144 and transmitting information obtained from the scan of the ticket/voucher back to the gaming server 116 as proof of redemption. Alternatively, or additionally, in the example case of an electronic ticket/voucher (e.g., an e-TITO voucher), a player 112 may to redeem the electronic ticket/voucher at a gaming device 108 or a communication device 144 by using an RFID reader that is in electronic communication with (e.g., electrically coupled to) the gaming device 108 or the communication device 144.

Thus, the redeeming device field 240 may store information uniquely describing the device used by the player 112 to redeem a ticket/voucher (e.g., an address or device ID). Alternatively or additionally, the redeeming device field 240 may store information describing a type of device that was used for redemption (e.g., whether the device is a gaming device 108 or a communication device 144).

The redemption date/time field 244, similar to the issued date/time field 232, may be used to store data and/or time information for the ticket/voucher. For example, the redemption date/time field 244 may be used to store a date/time when a ticket/voucher is redeemed as opposed to when the ticket is issued.

When the electronic record of the ticket/voucher state 252 is updated, a change to the date/time in field 244 may also be made at substantially the same time. As will be discussed in further detail herein, the ticket/voucher state field 252 may be used to store state or status information for a ticket/voucher and the state within the field 252 may be capable of having at least three different values (e.g., issued, redeemable, and redeemed).

The redemption value field 248 may be used to store an electronic record indicating an amount for which a ticket/voucher may be redeemed (e.g., a redeemable value) and/or an amount for which a ticket/voucher is actually redeemed (e.g., a redeemed/redemption amount).

With reference to FIG. 2C, details of a data structure 202 that may be maintained as part of a gaming device profile will be described in accordance with at least some embodiments of the present disclosure. The gaming device database 154 may be configured to store one or multiple data structures 202 that are used in connection with tracking a gameplay mode of a gaming device 108. In some embodiments, the data stored in the data structure 202 may be stored for a plurality of different gaming devices 108 or a single gaming device 108. As a non-limiting example, the data structure 202 may be used to store gaming device information, and the like. Even more specifically, the data structure 202 may include a plurality of data fields that include, for instance, a gaming device information field 256, a gaming system information field 258, a representative player behavior model field 260, a gaming system behavior model field 262, and a reward program model field 264.

The gaming device information field 256 may be used to store any type of information that identifies a gaming device 108 or a group of gaming devices 108. In some embodiments, the gaming device information field 256 may store identification information for a gaming device 108 (e.g., a unique serial number assigned to the gaming device 108) and any other type of gaming device management data that may be stored with respect to a gaming device 108.

The gaming system information field 258 may be used to store any type of gameplay and other gaming information including granular and/or summarized gameplay data, gaming system (e.g., casino floor) map showing gaming device location and current usage (e.g., heat map), and the like.

The representative player behavior model field 260 may store representative user decisions and predictions and hyperparameters and tunable parameters and may include a list of representative player behavior models. For example, the representative player behavior model field 260 may include a list of stored representative player behavior models (e.g., stored at the memory 124 of the gaming server 116, stored at the player profile database 148, stored at the gaming device database 154, etc.).

The gaming system behavior model field 262 may store gaming system model decisions or predictions and hyperparameters and tunable parameters and may include a list of gaming system behavior models. For example, the gaming system behavior model field 262 may include a list of stored gaming system behavior models (e.g., stored at the memory 124 of the gaming server 116, stored at the player profile database 148, stored at the gaming device database 154, etc.).

The reward program model field 264 may store reward program model decisions or predictions and hyperparameters and tunable parameters and may include a list of reward program models. For example, the reward program model field 264 may include a list of stored reward program models (e.g., stored at the memory 124 of the gaming server 116, stored at the player profile database 148, stored at the gaming device database 154, etc.).

In some aspects, the representative player behavior model, gaming system behavior model, and reward program model fields 260, 262, and 264 may store data (e.g., characteristics, features, use history, modifications, etc.) associated with the respective model. For example, the fields 260, 262, and 264 may store data associated with baseline models, modified versions of the models, or the like. In some examples, the fields may store accuracy information associated with decisions and predictions generated by the model with respect to an action or event (e.g., for the representative player behavior model (average speed of play, cash in amount, cash out amount, play session length, additional in-session cash in amounts, wager behavior, wagering speed, and idle time for the group of players represented), for the gaming system behavior model (player occupancy levels and locations in the gaming system and revenue realized), and for the reward program model (increase in revenue or player participation generated by a proposed reward offering).

Figure 3:
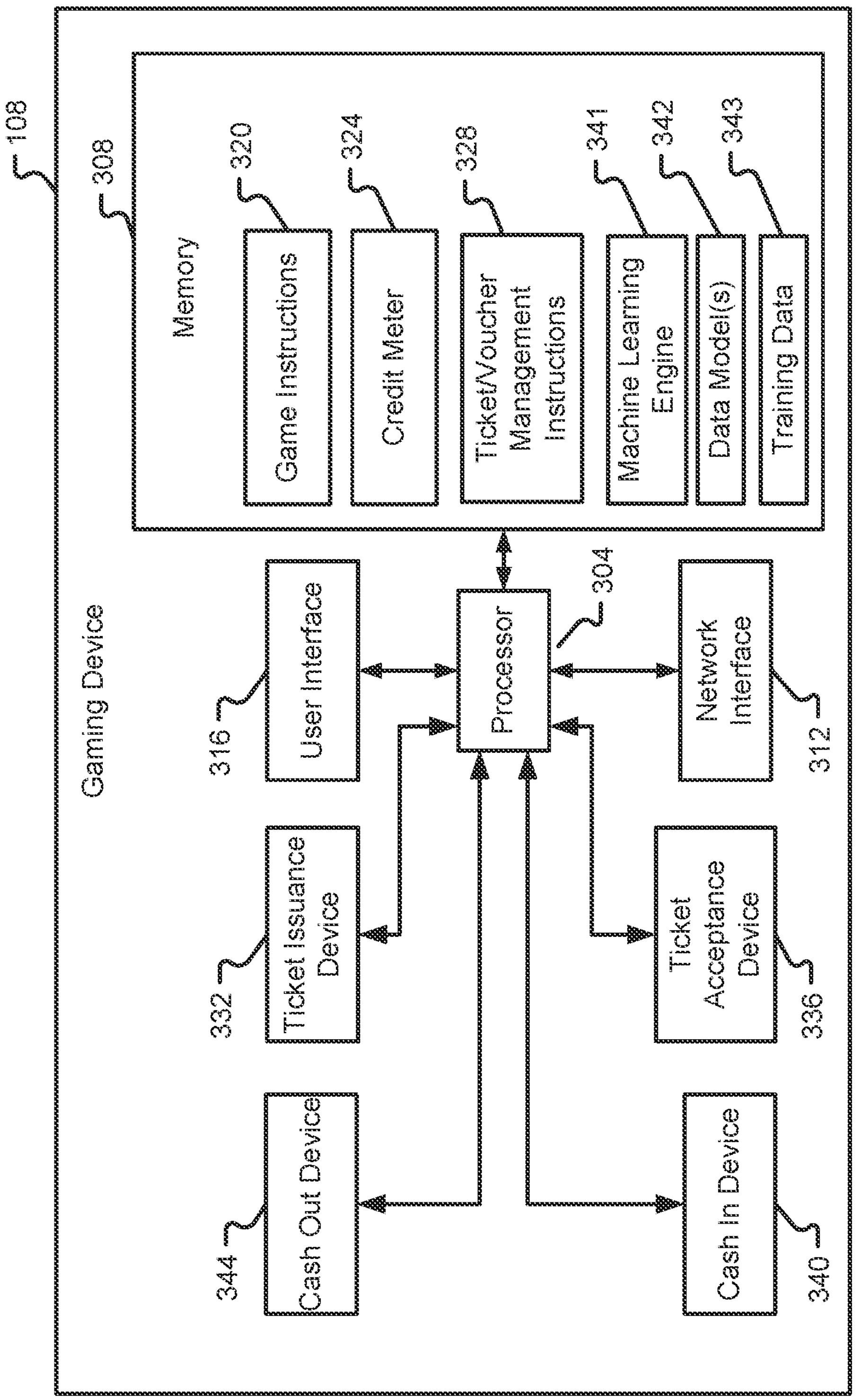
FIG. 3 is a block diagram of a gaming device in accordance with aspects of the present disclosure.

With reference now to FIG. 3, additional details of a gaming device 108 will be described in accordance with at least some embodiments of the present disclosure. While depicted as a gaming device 108, it should be appreciated that some or all of the components of the gaming device 108 may be included in a mobile device 144 described herein without departing from the scope of the present disclosure.

The gaming device 108 is depicted to include a processor 304, memory 308, a network interface 312, a user interface 316, a ticket issuance device 332, a ticket acceptance device 336, a cash-in device 340, and a cash out device 344. In some embodiments, the processor 304 may include example aspects of the processor 120. In other words, the processor 304 may correspond to one or many microprocessors, CPUs, microcontrollers, or the like. The processor 304 may be configured to execute one or more instruction sets stored in memory 308.

The network interface 312 may include example aspects of network interface 128. The nature of the network interface 312, however, may depend upon whether the network interface 312 is provided in a gaming device 108 or a communication device 144. Examples of a network interface 312 include, without limitation, an Ethernet port, a USB port, an RS-232 port, an RS-485 port, a NIC, an antenna, a driver circuit, a modulator/demodulator, etc. The network interface 312 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure.

The user interface 316 may correspond to any type of input and/or output device that enables the player 112 to interact with the gaming device 108. As can be appreciated, the nature of the user interface 316 may depend upon the nature of the gaming device 108. For instance, if the gaming device 108 is a traditional mechanical reel slot machine, then the user interface 316 may include one or more mechanical reels with symbols provided thereon, one or more lights or LED displays, one or more depressible buttons, a lever or "one armed bandit handle," a speaker, or combinations thereof. If the gaming device 108 is a digital device, then the user interface 316 may include one or more touch-sensitive displays, LED/LCD display screens, etc. In some cases, the user interface 316 may include a combination of a physical interface (e.g., mechanical reels, depressible buttons, a lever, etc.) and other user interfaces (e.g., touch-sensitive displays, LED/LCD display screens, etc.). In some cases, the user interface 316 may include a biometric scanning device (e.g., a fingerprint scanner) supportive of biometric inputs by a user. In some examples, the user interface 316 may include any combination of sensors 145 described with reference to FIG. 1 (e.g., an image sensor, an eye tracking sensor, a heart rate sensor, an infrared sensor, an audio sensor, a pulse sensor, an oxygen sensor, a temperature sensor, a pressure sensor, a touch screen sensor, a vibration sensor, a motion sensor, an accelerometer, etc.).

In some examples, the user interface 316 may include an interface for implementing an auto play mode described herein. For example, the user interface 316 may support the selection of a player behavior and the invoking of an auto play mode based on the player behavior. In some other examples, the user interface 316 may support a player-based "Bet" button described herein.

The memory 308 may include example aspects of memory 124. For instance, the memory 308 may include one or multiple computer memory devices that are volatile or non-volatile. The memory 308 may be configured to store instruction sets that enable player interaction with the gaming device 108, that enable game play at the gaming device 108, and/or that enable coordination with the gaming server 116. Examples of instruction sets that may be stored in the memory 308 include a game instruction set 320, a credit meter 324, and a ticket/voucher management instruction set 328.

In some embodiments, the game instruction set 320, when executed by the processor 304, may enable the gaming device 108 to facilitate one or more games of chance or skill and produce interactions between the player 112 and the game of chance or skill. In some embodiments, the game instruction set 320 may include subroutines that present one or more graphics to the player 112 via the user interface 316, subroutines that calculate whether a particular wager has resulted in a win or loss during the game of chance or skill, subroutines for determining payouts for the player 112 in the event of a win, subroutines for exchanging communications with a connected server (e.g., game management server, gaming server 116, or the like), subroutines for enabling the player 112 to engage in a game using their communication device 144, and any other subroutine or set of instructions that facilitate gameplay at or in association with the gaming device 108.

In some aspects, the game instruction set 320, when executed by the processor 304, may enable the gaming device 108 to facilitate interactions between the player in association with invoking a reward program offering and rendering a reward indicator. In an example, the game instruction set 320 may include subroutines that present, via the user interface 316, the reward indicator and other messaging associated with the reward offering. In some examples, the game instruction set 320 may include subroutines that present the reward indicator and other messaging associated with the reward offering.

The credit meter 324 may correspond to a secure instruction set and/or data structure within the gaming device 108 that facilitates a tracking of activity at the gaming device 108. In some embodiments, the credit meter 324 may be used to store or log information related to various activities of a player 112 and events that occur at the gaming device 108. The types of information that may be maintained in the credit meter 324 include, without limitation, player information, available credit information, wager amount information, and other types of information that may or may not need to be recorded for purposes of accounting for wagers placed at the gaming device 108 and payouts made for a player 112 during a game of chance or skill played at the gaming device 108.

In some embodiments, the credit meter 324 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 108, and the like. In some embodiments, certain portions of the credit meter 324 may be updated in response to outcomes of a game of chance or skill played at the gaming device 108. In some embodiments, the credit meter 324 may be updated depending upon whether the gaming device 108 is issuing a ticket/voucher, being used as a point of redemption for a ticket/voucher, and/or any other activity associated with a ticket/voucher. Some or all of the data within the credit meter 324 may be reported to the gaming server 116, for example, if such data applies to a centrally-managed game and/or a status of a ticket/voucher. As an example, the number, value, and timing of wagers placed by a particular player 112 and payouts on such wagers may be reported to the gaming server 116.

Activities of the gaming device 108 related to ticket/voucher activity may be managed and reported by the ticket/voucher management instruction set 328. In some embodiments, when a ticket/voucher is redeemed at the gaming device 108 by the player 112, information associated with the ticket/voucher may be obtained by the ticket/voucher management instruction set 328 and reported to the gaming server 116. Furthermore, the ticket/voucher management instruction set 328 may be configured to update the credit meter 324 if the redeemed ticket/voucher is determined to be in a redeemable state and has a redeemable or redemption value associated therewith. In some embodiments, the credit meter 324 may be updated or incremented by the redeemable or redemption value of the ticket/voucher when redeemed. This information may be obtained directly from the ticket/voucher or may include some interactions (e.g., verification operations) with the gaming server 116 prior to updating the credit meter 324.

The gaming device 108 may be provided with appropriate hardware to facilitate acceptance and issuance of tickets/vouchers. Specifically, the gaming device 108 may be provided with a ticket acceptance device 336 that is configured to accept or scan physically-printed tickets/vouchers and extract appropriate information therefrom. In some embodiments, the ticket acceptance device 336 may include one or more machine vision devices (e.g., a camera, IR scanner, optical scanner, barcode scanner, etc.), a non-visual scanning device (e.g., an RFID reader, an NFC reader), a physical ticket acceptor, a shredder, etc. The ticket acceptance device 336 may be configured to accept physical tickets and/or electronic tickets without departing from the scope of the present disclosure. An electronic ticket/voucher may be accepted by scanning a visual code (e.g., a one-dimensional barcode, a two-dimensional barcode, any other type of barcode, a quick response (QR) code, etc.) displayed on a printed ticket/voucher or a communication device 144, for example. In another example, an electronic ticket/voucher may be accepted by scanning a tag (e.g., an RFID tag, an NFC tag, a contactless smart card, or the like) storing the ticket/voucher information.

The ticket issuance device 332 may be configured to print or provide physical tickets/vouchers to players 112. In some embodiments, the ticket issuance device 332 may be configured to issue a ticket/voucher consistent with an amount of credit available to a player 112, possibly as indicated within the credit meter 324. In some cases, the ticket/voucher may be an e-TITO voucher including a reprogrammable electronic display and an RFID tag.

The cash-in device 340 may include a bill acceptor, a coin acceptor, a chip acceptor or reader, or the like. In some embodiments, the cash-in device 340 may also include credit card reader hardware and/or software. In some aspects, the cash-in device 340 may include one or more machine vision devices (e.g., a camera, IR scanner, optical scanner, barcode scanner, etc.) or non-visual scanning devices (e.g., an RFID reader/writer, an NFC reader/writer).

The cash-out device 344, like the ticket issuance device 322, may operate and issue cash, coins, tokens, or chips based on an amount indicated within the credit meter 324. In some embodiments, the cash-out device 344 may include a coin tray or the like and counting hardware configured to count and distribute an appropriate amount of coins or tokens based on a player's 112 winnings or available credit within the credit meter 324. In some aspects, the cash-out device 344 may include one or more machine vision devices or non-visual scanning devices.

The memory 308 may be configured to store instruction sets, neural networks, and other data structures (e.g., depicted herein) in addition to temporarily storing data for the processor 304 to execute various types of routines or functions. For example, the memory 308 may be configured to store program instructions (instruction sets) that are executable by the processor 304 and provide functionality of a machine learning engine 341 described herein. The machine learning engine 341 may include example aspects of the machine learning engine 141 described with reference to FIG. 1.

One example of data that may be stored in memory 308 for use by components thereof is a data model(s) 342 and/or training data 343. The data model(s) 342 and the training data 343 may include examples of aspects of the data model(s) 142 and the training data 143 described with reference to the gaming server 116. The gaming device 108 (e.g., the machine learning engine 341) may utilize one or more data models 342 for recognizing and processing information obtained by the gaming device 108, another gaming device 108, a server (e.g., the gaming server 116), communication devices 144, and/or a database (e.g., player profile database 148, ticket/voucher database 152, and/or gaming device database 154). In some aspects, the gaming device 108 (e.g., the machine learning engine 341) may update one or more data models 342 based on learned information included in the training data 343.

In some aspects, components of the machine learning engine 341 may be provided in a separate machine learning engine (e.g., at server, for example, the gaming server 116) in communication with the gaming device 108.

Figure 5:
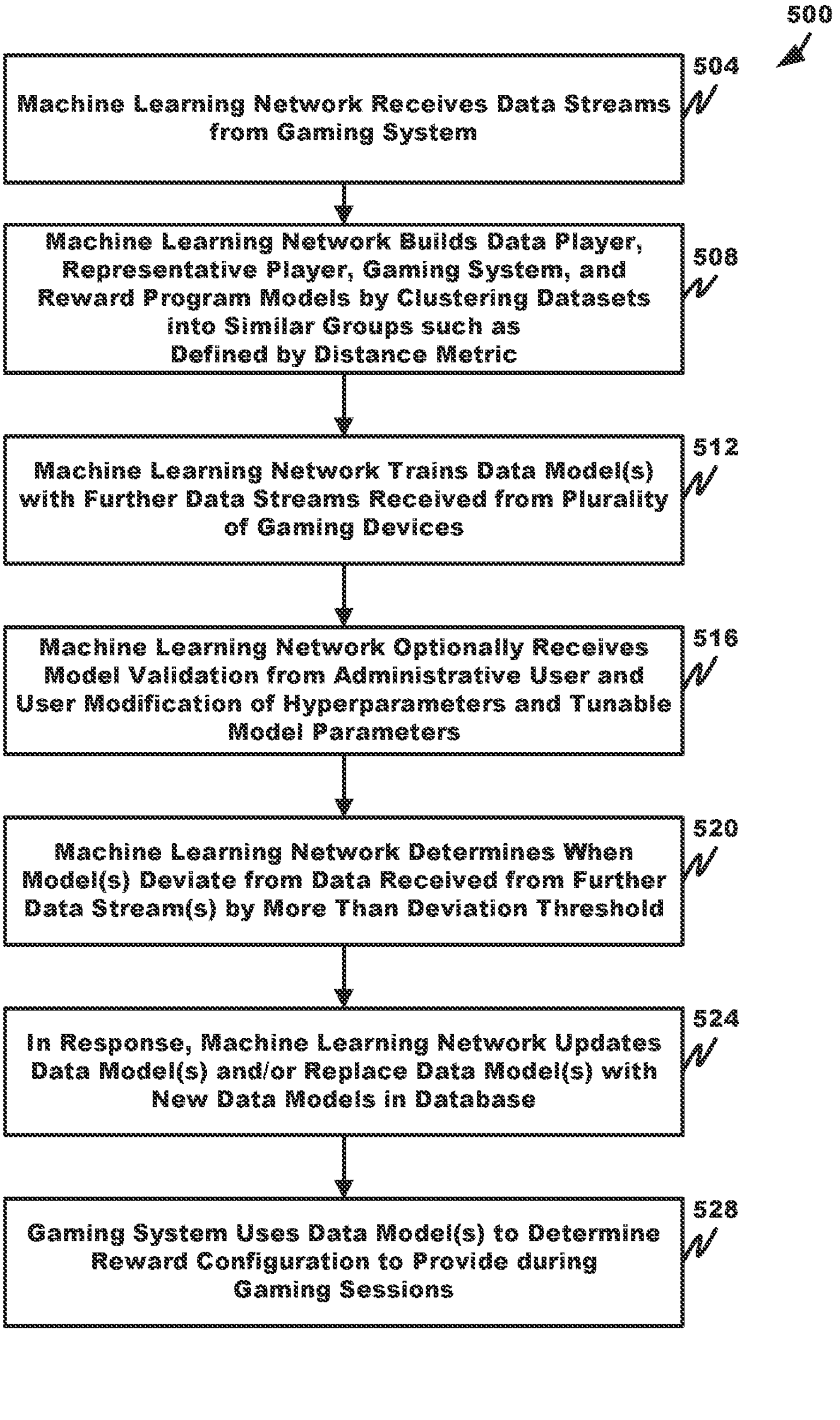
FIG. 5 is a process flow illustrating aspects of self-evolving, AI-based models in accordance with aspects of the present disclosure.
Figure 6:
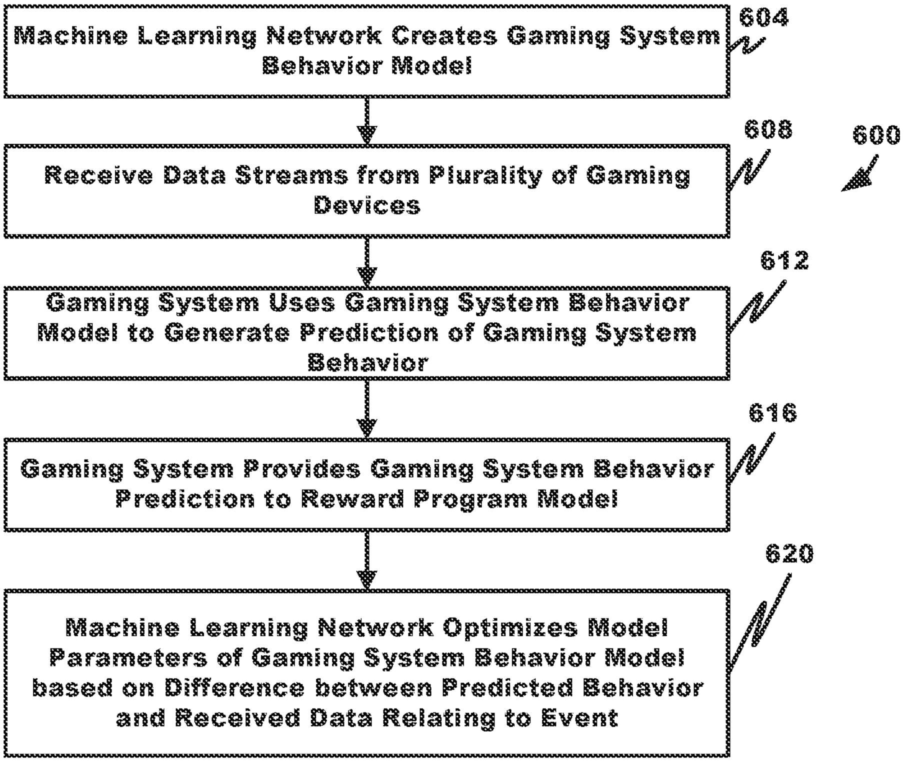
FIG. 6 is a process flow illustrating aspects of self-evolving, AI-based gaming system behavior model in accordance with aspects of the present disclosure.

FIG. 5 illustrates an example of a process flow 500 that supports aspects of the present disclosure associated with generating, training, and applying self-evolving AI-based player behaviors described herein. The process flow 500 supports aspects of the present disclosure associated with a player behavior applied to a gameplay session. In some examples, process flow 500 may implement aspects of gaming system 100. Further, process flow 500 may be implemented by a gaming system 100 or components included therein as described with reference to FIGS. 1 through 4.

In the following description of the process flow 500, the operations may be performed in a different order than the order shown, or the operations may be performed in different orders or at different times. Certain operations may also be left out of the process flow 500, or other operations may be added to the process flow 500. It is to be understood that any device (e.g., a gaming device 108, a gaming server 116, a communication device 144, components of the system 100, etc.) may perform the operations shown.

Referring now to FIG. 5, a method of using data model(s) to provide reward program offerings to gaming devices 108*a-n* during gameplay sessions will be described in accordance with embodiments of the present disclosure. The method begins when the gaming server 116 receives data streams from a plurality of gaming devices 108*a-n* and communication device(s) 144 (step 504). Besides historical input gameplay data, real-time play data is collected from all potentially participating gaming devices across the gaming system (e.g., casino floor) and fed into the same or a connected database. The gaming server 116 may utilize the machine learning engine 141 to build the data models 142 that describe and predict player 112 behaviors during gameplay sessions at gaming devices 108*a-n* and communication devices 144 (step 608). In some embodiments, the data models 142 may be trained on hundreds or thousands of gameplay data sets describing events occurring at a gaming device 108 and/or communication device 144 when a player 112 interacts with the gaming device 108 and/or communication device 144 during a gameplay session (step 612). The training of the data models may or may not include user validation (e.g., human feedback). If user validation is desired as part of training the data model(s) 142, then the method may include requesting validation inputs from an administrative/training user (step 616).

By way of example, the machine learning network can start with creating and training baseline models with historical game play data 400 and 404. This could be either granular or summarized gameplay data showing each gaming device's summarized performance data for a period of time. While granular gameplay data, based on spin level (e.g., every single game action tracked per EGM) can provide far more details and insights, such detailed gameplay data can also require significantly more CPU power to be processed. The granular gameplay data can be used to train the individual player behavior models while summarized gameplay data can be used to train the representative player behavior and gaming system behavior models. Which training data is employed can vary by gaming system configuration (e.g., available processing resources) and requirements.

Initially, historical player behavior, representative player, and gaming system behavior models are trained using historical gameplay data (summarized and/or granular) to have artificial "average behavior models" to simulate a set of gameplay operations. These models could be fed continuously with newly generated gameplay data, e.g., in real-time, once per month etc. and thus, be kept up to date and realistic to the most recent play behavior.

From a database where all data from all machines on the floor are collected, we would extract those features which can be important to creating valid historical gaming system models, such as "number of players in the venue", "time of the day", "crowded casino areas" and many more from the plurality of EGMs among the casino floor. Calculations may be required to better understand correlations and impacts from one feature to another, enabling more detailed insights and leading to even more expressive new features.

The initial representative player and gaming system (e.g., average) behavior models' output can be used as input for training the reward program model. Human supervision may be required to evaluate how well each of the representative player and gaming system behavior models would have performed, and based on the artificial outcome, the reward program model could be trained and improved until it generates desired output (e.g., reward program trigger frequency based on player and gaming system behavior). While historical performance data is used to train the initial reward program model, real output data from the reward program logs can provide greater insight on the change of player behavior during participation in the reward program and thus, based on this more insightful data, train more accurate models. Such insights could also be used to train not only individual player behavior models but also representative player and gaming system behavior (e.g., average) models. Output decisions and predictions thereinto may also be used to further develop the reward program model, fine-tune it, and perhaps provide new functions/features to it, which might not be obvious without generated output data.

Returning to FIG. 5 once trained on appropriate (e.g., predetermined number) of data sets received from gameplay data streams of gaming devices 108 and communication devices 144, the model(s) may be used by the machine learning engine 141 and/or game management instructions 140 to analyze further data streams received from gaming devices 108 in real-time and then make decisions to provide game features or update aspects of the gaming devices 200 based on the analysis performed. For example once the baseline models (individual and representative player behavior models and reward program model) have been trained and adjusted, they would be tested and verified by virtually running a great number of gaming system operations before going live. Once these tests are accomplished with promising results, the various models would be applied in the real gaming system (e.g., casino) scenario and compared with "real-time play behavior" from actual players, to have the program running in a live scenario.

In some embodiments, the machine learning engine 141 may also be configured to monitor a performance of the data received from the gameplay data streams as compared to output of the models to determine if the actual gameplay data is deviating from outputs produced by the respective model. Some deviation may be tolerated, but if the deviation exceeds a predetermined deviation threshold (step 520), then the method may continue with the gaming server 116 determining to update or replace the output-producing data model 142 from which the actual data has deviated by more than the predetermined deviation threshold (step 524).

A (data) model 142 may be updated by changing one or more coefficients or tunable parameters connecting one or more nodes in a neural network. Alternatively or additionally, a (data) model 142 may updated by adding or subtracting one or more nodes or node levels from the model 142 to more closely align outputs of the (data) model to actual data observed on the gameplay data streams. A (data) model may be replaced by being deleted from memory and then having a different/new (data) model stored as a replacement therefor.

The updated or new/replacement (data) model(s) 142 may then again be used by the gaming system (e.g., gaming server) for analysis of data contained in data streams generated by gaming devices 108 (step 528). In other words, the updated or new models 142 may be used to continue performing the various analysis (e.g., real-time analysis) tasks depicted and described herein. The overall outcome would be models that collectively receive all the inputs (player behavior and cash income), know the desired net wins for the gaming system, and based on these inputs and outputs, enable the reward program model to create its outputs (e.g., reward program offering triggers, payout, and pulse to hit frequency) and is thus, fully automatedly capable of executing the AI-based reward program.

FIGS. 6-9 illustrate another example of a process flows 600, 700, 800, and 900 that supports aspects of the present disclosure associated with generating, training, and applying self-evolving AI-based player behaviors described herein. In the following description of the process flows 600, 700, 800, and 900, the operations may be performed in a different order than the order shown, or the operations may be performed in different orders or at different times. Certain operations may also be left out of the process flow, or other operations may be added to the process flow. It is to be understood that any device (e.g., a gaming device 108, a gaming server 116, a communication device 144, components of the system 100, etc.) may perform the operations shown.

The process flow 600 supports aspects of the present disclosure associated with a gaming system behavior model applied to a gameplay session. In some examples, process flow 600 may implement aspects of gaming system 100. Further, process flow 600 may be implemented by a gaming system 100 or components included therein as described with reference to FIGS. 1 through 4.

At 604, the machine learning engine in the gaming server 116 may generate a gaming system behavior model 142 based on a set of historic gameplay data from a set of previous gameplay sessions. In some aspects, the set of previous gameplay sessions are associated with a first game type. In some aspects, the gaming system behavior model may include a self-evolving model.

At 608, the gaming system receives data streams from a plurality of gaming devices.

At 612, the gaming system uses the gaming system behavior model to generate prediction(s) of gaming system behavior over a future time interval.

At 616, the gaming system provides the behavior prediction(s) to the reward program model. Exemplary gaming system behavior predictions include a number of players in the gaming system venue and/or playing a type of gaming device, player attendance levels in different venue physical areas and/or at different gaming devices, gaming revenue to be realized individually by each gaming device or collectively by a given type of gaming device, from each player or selected group of players, collectively by a type of game, and/or by the gaming system as a whole, number of different players repeatedly playing a gaming device, and the like.

At 620, the machine learning network optimizes the model parameters of the gaming system behavior model based on a difference between the predicted behavior(s) and the received data relating to the actual events corresponding to the predicted behavior(s).

Figure 7:
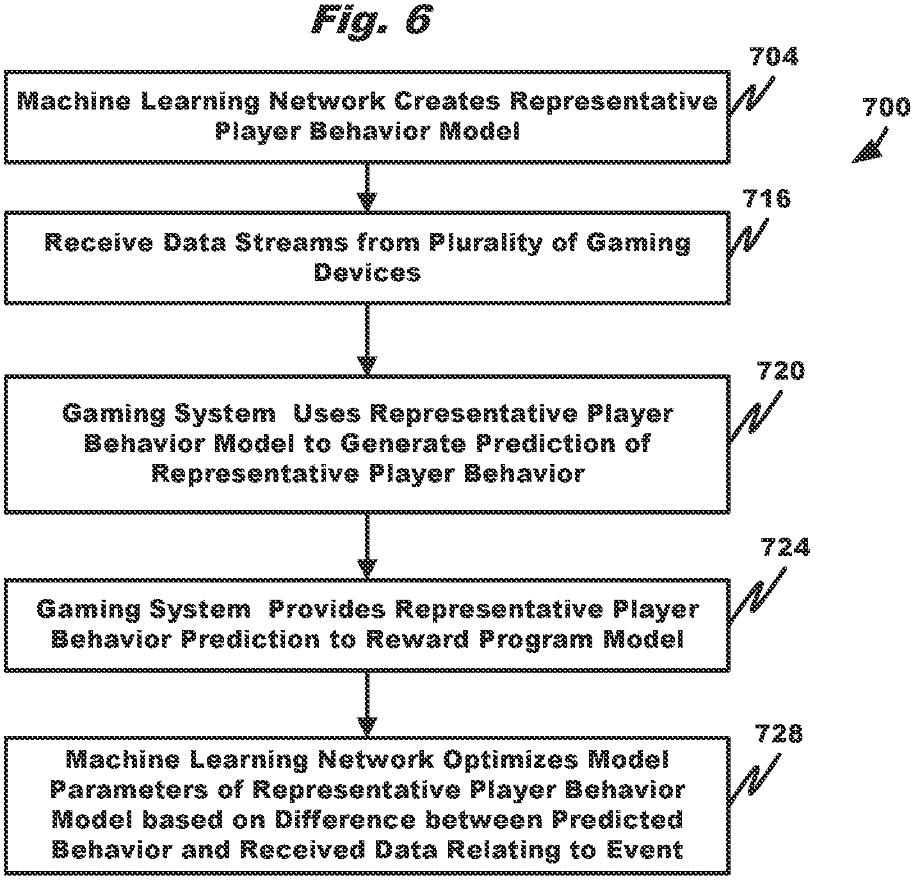
FIG. 7 is a process flow illustrating aspects of self-evolving, AI-based representative player behavior model in accordance with aspects of the present disclosure.

Turning now to FIG. 7, the process flow 700 supports aspects of the present disclosure associated with a representative player behavior model applied to a gameplay session. In some examples, process flow 700 may implement aspects of gaming system 100. Further, process flow 700 may be implemented by a gaming system 100 or components included therein as described with reference to FIGS. 1 through 4.

At 704, the machine learning engine in the gaming server 116 may generate a representative player behavior model 142 based on a set of historic gameplay data from a set of previous gameplay sessions. In some aspects, the set of previous gameplay sessions are associated with a first game type. In some aspects, the gaming system behavior model may include a self-evolving model.

At 708, the gaming system receives data streams from a plurality of gaming devices.

At 712, the gaming system uses the representative player behavior model to generate prediction(s) of representative player behavior over a future time interval.

At 716, the gaming system provides the behavior prediction(s) to the reward program model. Exemplary representative player behavior predictions include speed of play, cash in amount, cash out amount, play session length, additional in-session cash in amounts, wager behavior (e.g., during and/or after a reward offering, after a bonus, after a win, after a loss, etc.), wagering speed (e.g., intensity), idle time, other gameplay session decisions, and the like.

At 720, the machine learning network optimizes the representative player behavior model parameters based on a difference between the predicted behavior(s) and the received data relating to the actual events corresponding to the predicted behavior(s).

Figure 8:
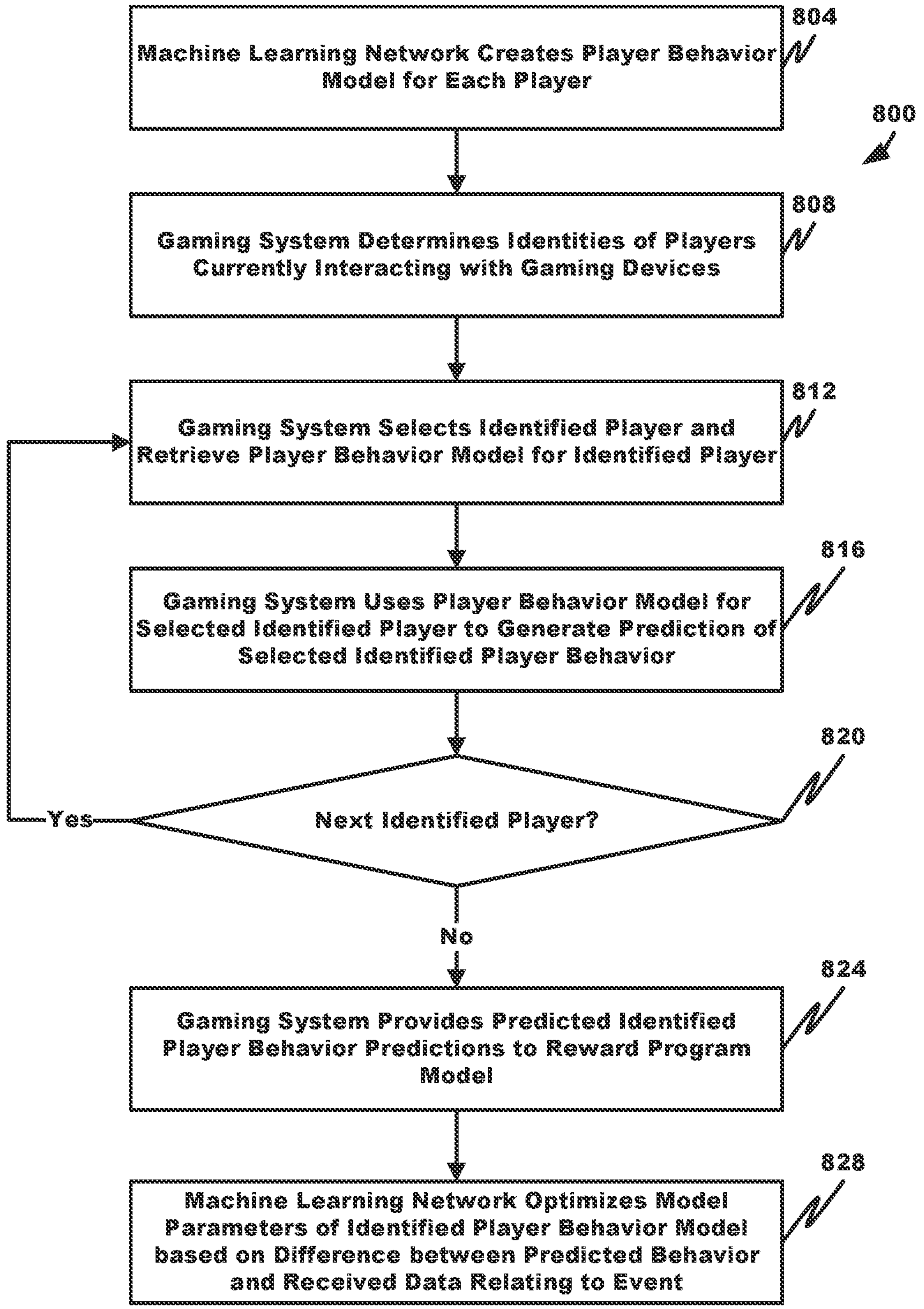
FIG. 8 is a process flow illustrating aspects of self-evolving, AI-based individual player behavior model in accordance with aspects of the present disclosure.

Turning now to FIG. 8, the process flow 800 supports aspects of the present disclosure associated with an individual player behavior model applied to a gameplay session. In some examples, process flow 800 may implement aspects of gaming system 100. Further, process flow 800 may be implemented by a gaming system 100 or components included therein as described with reference to FIGS. 1 through 4.

At 804, the machine learning engine in the gaming server 116 may generate a player behavior model 142 for each player (whether or not currently playing) based on a set of historic gameplay data from a set of previous gameplay sessions. In some aspects, the set of previous gameplay sessions are associated with a first game type. In some aspects, the player behavior model may include a self-evolving model.

At 808, the gaming system identifies which players are currently interacting with (e.g., playing) gaming devices.

At 812, the gaming system selects an identified player and, for the selected identified player, retrieves the corresponding player behavior model.

At 816, the gaming system uses the retrieved player behavior model for the selected identified player to generate prediction(s) of a behavior of the selected identified player over a future time interval. Exemplary player behavior predictions include speed of play, cash in amount, cash out amount, play session length, additional in-session cash in amounts, wager behavior (e.g., during and/or after a reward offering, after a bonus, after a win, after a loss, etc.), wagering speed (e.g., intensity), idle time, other gameplay session decisions, and the like.

At 820, the gaming system determines if there is a next identified player. If so, the gaming system returns and repeats step 812. The gaming system otherwise continues to step 828.

At 824, the gaming system provides the predicted identified player behavior predictions to the reward program model.

At 828, the machine learning network optimizes the model parameters of each identified player behavior model based on a difference between a predicted behavior and received gameplay data relating to the actual event corresponding to the predicted behavior.

Figure 9:
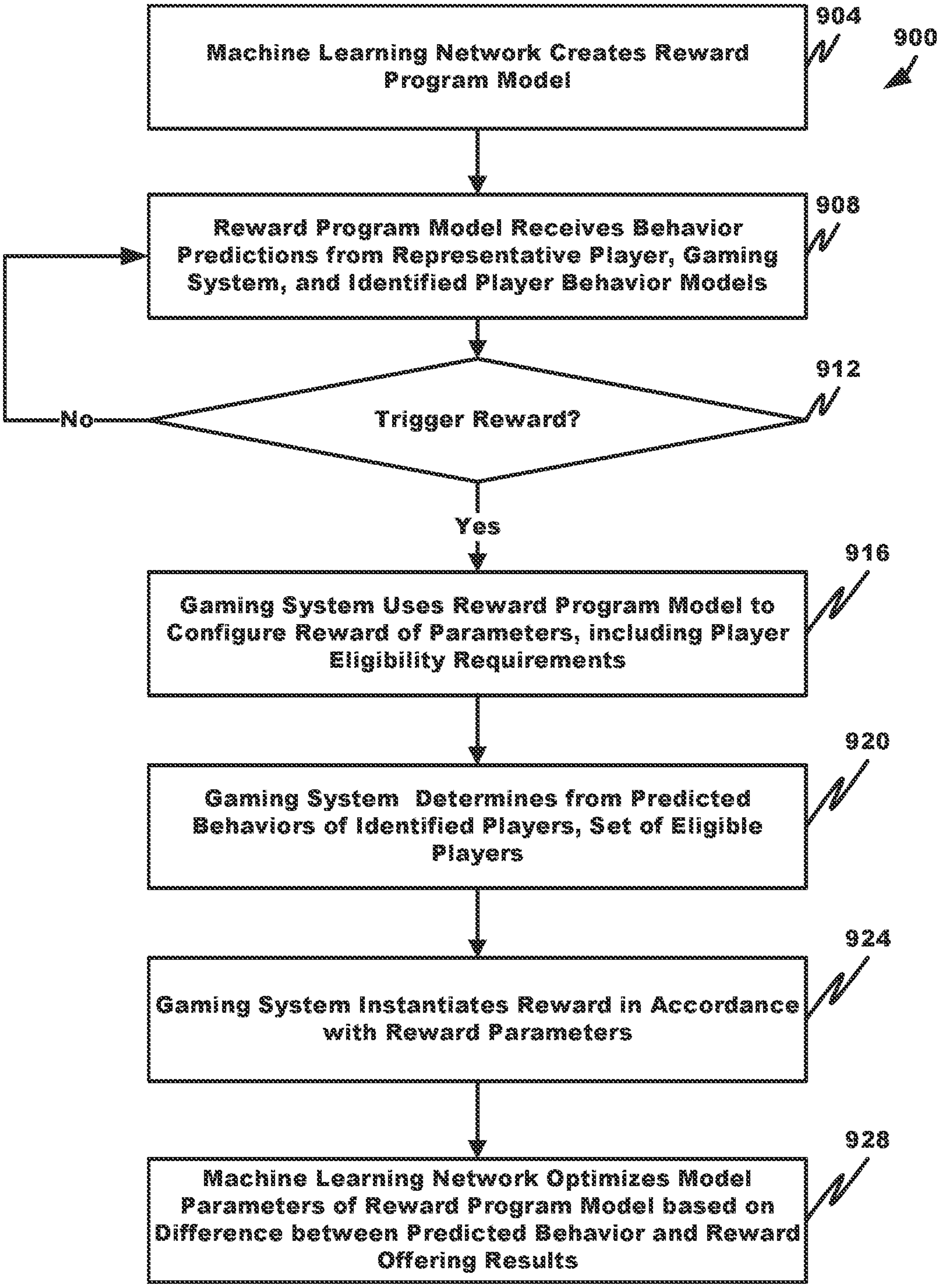
FIG. 9 is a process flow illustrating aspects of self-evolving, AI-based reward program model in accordance with aspects of the present disclosure.

Turning now to FIG. 9, the process flow 900 supports aspects of the present disclosure associated with an individual player behavior model applied to a gameplay session. In some examples, process flow 900 may implement aspects of gaming system 100. Further, process flow 800 may be implemented by a gaming system 100 or components included therein as described with reference to FIGS. 1 through 4.

At 904, the machine learning network creates the reward program model using gameplay data 400 and 404 and prior output from the other models.

At 908, the reward program model receives behavior predictions from the representative player, gaming system, and identified player behavior models.

At 912, the reward program model determines whether or not to trigger the reward offering. While the criteria for triggering the reward program offering varies by application, typical trigger criteria used includes one or more of meeting or exceeding a specified level of gaming earnings or revenue (e.g., "trigger hopping reward program every $ X earned") realized individually by each gaming device or collectively by a given type of gaming device, from each player or selected group of players, collectively by a type of game, and/or by the gaming system as a whole, at least minimum number of players in the gaming system venue and/or playing a type of gaming device, at least minimum but no more than a threshold number of player attendance levels in a selected venue physical area and/or at different gaming devices, at least minimum number of different players repeatedly playing a gaming device, speed of play less than a selected threshold, at least minimum level of wager behavior (e.g., during and/or after a reward offering, after a bonus, after a win, after a loss, etc.), wagering speed (e.g., intensity) less than a selected threshold, idle time more than a selected threshold, and the like. The trigger can, in some applications, by random based on output by the PRNG/RNG. If the reward offering, the reward program model returns to and repeats step 908.

If the determination is to trigger the reward offering, the gaming system, at 916, uses the reward program model to configure reward offering parameters, including player eligibility requirements, payout, and reward indicator configuration settings, and the like. The eligibility threshold requirements for players can be determined on any number of predicted behaviors from the individual player behavior models. Example predicted behaviors include at least minimum level of wager behavior (e.g., during and/or after a reward offering, after a bonus, after a win, after a loss, etc.), at least minimum wager amount per unit time, at least minimum level of player occupancy of the gaming devices, type of gaming devices, and/or game type, level of occupancy of a venue area (e.g., identify in which areas of the venue the reward program should be enabled, such as a less frequently played area of the casino), and the like. In determining player eligibility, the predicted behavior can be coupled with a minimum probability of prediction accuracy (e.g., the player to be eligible must have at least a 50% likelihood of performing the predicted behavior)(. The model can determine payout and pulse-to-hit frequency based on predicted wager behavior of the eligible players in response to the reward offering. The gaming system could allow the operator to set some hyperparameters, e.g., "how much money must be earned until the reward can be paid out earliest" or "more minor jackpots instead of fewer bigger jackpots" or "a trigger percentage", etc. The hyperparameters could be defined by the operator (e.g., hardcoded numbers or floating values) or automatically adjusted by the gaming system, based on various input data. The remaining configuration decisions can be done by the reward program model.

At 920, the gaming system determines from the predicted behaviors, such as by comparing the predicted behaviors of the representative behavior model to those of the individual player behavior models or from the predicted behaviors of the individual player models themselves, a set of eligible players to receive the reward offering.

At 924, the gaming system instantiates the reward offering in accordance with the reward configuration parameters.

At 928, the machine learning network optimizes model parameters of the reward program model based on a difference between a predicted behavior for the reward offering (e.g., increased speed of play or wagering speed by eligible players, increased gambling revenue, increased cash in amounts for eligible players, more aggressive wager behavior by eligible players, decreased idle time of the eligible players, increase in placed wager amounts, and the like) and the corresponding reward offering results.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central gaming server, central gaming controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A gaming system comprising:

a communication interface;

a processor coupled with the communication interface; and a computer-readable storage medium coupled with the processor, the computer-readable storage medium storing data thereon that enables the processor to:

provide historical gameplay data, the historical gameplay data comprising a plurality of different predetermined types of data;

based on the historical gameplay data, change a parameter of a trained corresponding player behavior model for each player of a plurality of players;

update an electronic record associated with each player's trained corresponding behavior model to reflect the changed parameter, the changed parameter being different for each player's trained corresponding player behavior model;

for each player in the plurality of players, determine, by the trained corresponding player behavior model, a plurality of potential predicted behaviors of a respective player over a future time interval in response to a reward offering;

select, as a predicted behavior of a corresponding player, a potential predicted player behavior having at least a threshold probability of occurrence;

update an electronic record associated with each player to reflect a corresponding selected potential predicted player behavior;

determine, by a gaming system behavior model, a plurality of predicted behaviors of a gaming system component over the future time interval;

select, as a predicted behavior of the gaming system, a potential predicted gaming system behavior having at least a threshold probability of occurrence;

update an electronic record associated with the gaming system to reflect the selected potential predicted gaming system behavior;

based on the selected potential predicted gaming system behavior, determine to instantiate an opportunity to receive a reward in addition to a gameplay session outcome over the future time interval to produce a target outcome;

for each player in a set of players, compare the selected potential predicted player behavior corresponding to each player in the set of players against a predicted behavior from a collective behavior model representing a collective behavior of the set of players to select at least first and second players satisfying one or more player gameplay behavior thresholds;

provide, during different gameplay sessions of the at least first and second players, respectively, during the future time interval a reward indicator to a gaming device of each of the at least first and second players, the reward indicator corresponding to the opportunity to receive the reward offering in addition to a gameplay session outcome;

track in real time gameplay behavior of the at least first and second players in the set of players in the different gameplay sessions to generate real time gameplay data over the future time interval, each player of the at least first and second players corresponding to a different set of real time gameplay data;

based on the real time gameplay data, determine an actual behavior of each of the at least first and second players and an actual behavior of the gaming system component over the future time interval;

for a selected player of the at least first and second players, compare the selected potential predicted player behavior of the selected player against the actual behavior of the selected player over the future time interval to determine a respective deviation threshold;

when the respective deviation threshold for the selected player exceeds a predetermined player deviation threshold, change the parameter of the trained corresponding player behavior model for the selected player, the trained corresponding player behavior model for each player in the set of players being different from a trained corresponding player behavior model for another player in the set of players; and update the electronic record associated with the trained corresponding player behavior model to reflect the changed parameter.

2. The system of claim 1, wherein the real time gameplay data comprises one of speed of play, cash in amount, wager behavior, wagering speed, cash out amount, play session length, additional in-session cash in amounts, and idle time, wherein the selected potential predicted player behavior of the respective player comprises a predicted gameplay behavior of the respective player, wherein the processor compares the selected potential predicted player behavior of a selected player to the selected potential predicted player behavior of another player to select the at least first and second players, and wherein the reward comprises one or more of mystery cash win, mystery triggered bonus game, bonus WILD symbol, side jackpot, secondary bonus game, and a loyalty reward.

3. The system of claim 1, wherein the processor causes an avatar associated with the reward offering to move, after a first determined residence time, from a first gaming display rendering a first gameplay session associated with the first player to a second gaming display rendering a second gameplay session associated the second player and to move, after a second determined residence time, from the second gaming display rendering the second gameplay session associated with the second player to a third gaming display rendering a third gameplay session associated a third player satisfying one or more player gameplay behavior thresholds.

4. The system of claim 1, wherein, in selecting the at least first and second players, the processor further compares first output from a first trained corresponding player behavior model against second output from a second trained corresponding player behavior model to determine whether each of the at least first and second players satisfy one or more player gameplay behavior thresholds.

5. The system of claim 1, wherein the reward offering is independent of a final outcome of a current gameplay session associated with the at least first and second players and wherein the processor further determines, based on an output from the collective behavior model, a reward amount and reward pulse to hit frequency, compares the selected potential predicted gaming system behavior over the future time interval against an actual behavior of the gaming system component over the future time interval to determine a deviation threshold, and when the deviation threshold for the gaming system component exceeds a predetermined gaming system component deviation threshold, change a parameter of the gaming system behavior model.

6. The system of claim 3, wherein the one or more player gameplay behavior thresholds comprise a predicted reaction of a selected player to being offered the reward offering and a casino benefit realized from offering the reward offering to the selected player and wherein the gaming system behavior model predicts a behavior of gaming devices associated with the set of players.

7. The system of claim 3, wherein the one or more player gameplay behavior thresholds comprise speed of play, money wagered per time, and floor-average comparison and wherein the collective behavior model comprises a representative player behavior model predicting a behavior of a representative player in the set of players.

8. A method, comprising:

providing historical gameplay data, the historical gameplay data comprising a plurality of different predetermined types of data;

based on the historical gameplay data, changing a parameter of a trained corresponding player behavior model for each player of a plurality of players;

updating an electronic record associated with each player behavior model to reflect the changed parameter, the changed parameter being different for each player's trained corresponding player behavior model;

for each player in the plurality of players, receiving, from the trained corresponding player behavior model, a plurality of potential predicted behaviors of a respective player over a future time interval in response to a reward offering;

selecting, as a predicted behavior of a corresponding player, a potential predicted player behavior having at least a threshold probability of occurrence;

updating an electronic record associated with each player to reflect a corresponding selected potential predicted player behavior;

receiving, from a gaming system behavior model, a plurality of predicted behaviors of a gaming system component over the future time interval;

selecting, as a predicted behavior of the gaming system, a potential predicted gaming system behavior having at least a threshold probability of occurrence;

updating an electronic record associated with the gaming system to reflect the selected potential predicted gaming system behavior;

based on the selected potential predicted gaming system behavior, determining to instantiate an opportunity to receive the reward offering in addition to a gameplay session outcome over the future time interval to produce a target outcome;

for each player in a set of players, comparing the selected potential predicted player behavior corresponding to each player in the set of players against a predicted behavior from a collective behavior model representing a collective behavior of the set of players to select at least first and second players satisfying one or more player gameplay behavior thresholds;

providing, during different gameplay sessions of the at least first and second players, respectively, during the future time interval a reward indicator to a gaming device of each of the at least first and second players, the reward indicator corresponding to the opportunity to receive the reward offering in addition to a gameplay session outcome;

tracking in real time gameplay behavior of the at least first and second players in the set of players in the different gameplay sessions to generate real time gameplay data over the future time interval, each player of the at least first and second players corresponding to a different set of real time gameplay data;

based on the real time gameplay data, determining an actual behavior of each of the at least first and second players and an actual behavior of the gaming system component over the future time interval;

for a selected player of the at least first and second players, comparing the selected potential predicted player behavior of the selected player against the actual behavior of the selected player over the future time interval to determine a respective deviation threshold;

when the respective deviation threshold for the selected player exceeds a predetermined player deviation threshold, changing the parameter of the trained corresponding player behavior model for the selected player, the trained corresponding player behavior model for each player in the set of players being different from a trained corresponding player behavior model for another player in the set of players;

updating the electronic record associated with the trained corresponding player behavior model to reflect the changed parameter of the trained corresponding player behavior model;

comparing the predicted behavior of the gaming system component over the future time interval against an actual behavior of the gaming system component over the future time interval to determine a deviation threshold;

when the deviation threshold for the gaming system component exceeds a predetermined gaming system component deviation threshold, changing a parameter of the gaming system behavior model; and updating the electronic record associated with the gaming system behavior model to reflect the changed parameter of the gaming system behavior model.

9. The method of claim 8, wherein the real time gameplay data comprises one of speed of play, cash in amount, cash out amount, play session length, additional in-session cash in amounts, wager behavior, wagering speed, and idle time, wherein the comparing compares the selected potential predicted player behavior of a selected player to the selected potential predicted player behavior of another player, and wherein the reward offering comprises one or more of mystery cash win, mystery triggered bonus game, bonus WILD symbol, side jackpot, secondary bonus game, and a loyalty reward.

10. The method of claim 8, further comprising:

after a first determined residence time, moving an avatar associated with the reward offering from a first gaming display rendering a first gameplay session associated with the first player to a second gaming display rendering a second gameplay session associated the second player; and after a different second determined residence time, moving the avatar from the second gaming display rendering the second gameplay session associated with the second player to a third gaming display rendering a third gameplay session associated a third player satisfying one or more player gameplay behavior eligibility thresholds.

11. The method of claim 8, wherein the reward offering is independent of a final outcome of a current gameplay session associated with the at least first and second players and wherein selecting of the at least first and second players further comprises:

comparing first output from a first trained corresponding player behavior model against second output from a second trained corresponding player behavior model to determine whether each of the at least first and second players satisfy one or more player gameplay behavior thresholds.

12. The method of claim 8, further comprising:

determining, based on output from a collective player behavior model, a reward amount and reward pulse to hit frequency and wherein the collective player behavior model comprises a representative player behavior model predicting a behavior of a representative player in the set of players.

13. The method of claim 10, wherein the one or more player gameplay behavior eligibility thresholds comprise a predicted reaction of a selected player to being offered the reward and a casino benefit realized from offering the reward to the selected player.

14. The method of claim 10, wherein the one or more player gameplay behavior eligibility thresholds comprise speed of play, money wagered per time, and floor-average comparison and wherein the collective behavior model comprises a gaming system behavior model predicting a behavior of gaming devices associated with the set of players.

15. A system comprising:

a communication interface;

a processor coupled with the communication interface; and a computer-readable storage medium coupled with the processor, the computer-readable storage medium comprising processor-executable instructions that, when executed by the processor, cause the processor to:

track in real time gameplay behavior of a set of players in different gameplay sessions to generate real time gameplay data;

based on the real time gameplay data, modify a parameter of a player gameplay behavior model;

update a stored electronic record to reflect the modified parameter;

determine, by a gaming system behavior model, a plurality of potential predicted behavior of a gaming system component over a future time interval in response to a reward program offering, the reward program offering being independent of a final outcome of a current gameplay session;

select, as a predicted gaming system behavior, a potential predicted gaming system behavior having at least a threshold probability of occurrence;

update a stored electronic record to reflect the selected potential predicted gaming system behavior;

determine, using the player gameplay behavior model, a plurality of potential predicted player gameplay behaviors over the future time interval resulting from the reward program offering;

select, as a predicted player gameplay behavior, a potential predicted player gameplay behavior having at least a threshold probability of occurrence;

update the stored electronic record to reflect the selected potential predicted player gameplay behavior;

compare the selected potential predicted gaming system behavior to a set of requirements to determine to offer the reward program offering to one or more players in the set of players over the future time interval;

provide, during the future time interval and during one or more gameplay sessions of the one or more players a reward indicator associated with the reward program offering to a gaming device of each of the one or more players;

determine, from gameplay data, a set of results corresponding to the reward program offering;

compare, by a machine learning network, the set of results against the selected potential predicted player gameplay behavior for the one or more players;

update the parameter of the player gameplay behavior model based on a difference between the set of results and the selected potential predicted player gameplay behavior; and update the stored electronic record to reflect the updated parameter of the player gameplay behavior model.

16. The system of claim 15, wherein the real time gameplay data comprises one of speed of play, cash in amount, cash out amount, play session length, additional in-session cash in amounts, wager behavior, wagering speed, and idle time, wherein the potential predicted gaming system behavior is associated with plural gaming devices, and wherein the reward program offering comprises one or more of mystery cash win, mystery triggered bonus game, bonus WILD symbol, side jackpot, and a loyalty reward.

17. The system of claim 15, wherein the processor causes an avatar associated with the reward program offering to move, after a first determined residence time, from a first gaming display rendering a first gameplay session associated with a first player of the one or more players to a second gaming display rendering a second gameplay session associated a second player of the one or more players and to move, after a second determined residence time, from the second gaming display rendering the second gameplay session associated with the second player to a third gaming display rendering a third gameplay session associated a third player of the one or more players.

18. The system of claim 15, wherein the player gameplay behavior model comprises a representative player behavior model and wherein the selected potential predicted player gameplay behavior is associated with a representative player derived from real time gameplay data from gameplay sessions of the set of players.

19. The system of claim 15, wherein the player gameplay behavior model comprises plural player gameplay behavior models, wherein each of the plural player gameplay behavior models corresponds to predicted behavior associated with a corresponding player of the one or more players, wherein each of the player gameplay behavior models is different from others of the plural player gameplay behavior models, wherein the processor further determines, based on the real time gameplay data, a reward amount and reward pulse to hit frequency, and wherein the one or more players are selected based on a player gameplay behavior threshold, the player gameplay behavior threshold comprising one or more of speed of play, money wagered per time, and floor-average comparison.

20. The system of claim 19, wherein one or more player gameplay behavior eligibility thresholds comprise a predicted reaction of a selected player to being offered the reward program offering and a casino benefit realized from offering the reward program offering to the selected player and wherein, in selecting the one or more players, the processor further compares first output from a first player gameplay behavior model associated with a first player against second output from a second player gameplay behavior model associated with a second player to determine whether each of at least first and second players satisfy one or more player gameplay behavior thresholds.

* * * * *